United States Patent
Henry et al.

(10) Patent No.: US 9,542,664 B2
(45) Date of Patent: Jan. 10, 2017

(54) STOCK MONITORING

(71) Applicant: INVENTOR-E LIMITED, Solihull (GB)

(72) Inventors: Dean Charles Henry, Solihull (GB); John Michael Venter, Birmingham (GB)

(73) Assignee: INVENTOR-E LIMITED, Shirley Solihull (GB)

( * ) Notice: Subject to any disclaimer, the term of this patent is extended or adjusted under 35 U.S.C. 154(b) by 0 days.

(21) Appl. No.: 14/480,126

(22) Filed: Sep. 8, 2014

(65) Prior Publication Data
US 2016/0071052 A1 Mar. 10, 2016

(51) Int. Cl.
*G06Q 10/08* (2012.01)
*H04B 5/00* (2006.01)

(52) U.S. Cl.
CPC .......... *G06Q 10/087* (2013.01); *H04B 5/0031* (2013.01); *H04B 5/0062* (2013.01)

(58) Field of Classification Search
CPC ....... G06Q 10/087; H04B 5/02; H04B 5/0062; H04B 5/0031; G06K 7/10386
See application file for complete search history.

(56) References Cited

U.S. PATENT DOCUMENTS

| 7,708,189 | B1 | 5/2010 | Cipriano | |
|---|---|---|---|---|
| 2005/0101309 | A1* | 5/2005 | Croome | G06F 9/445 |
| | | | | 455/418 |
| 2007/0093237 | A1 | 4/2007 | Bayne | |
| 2007/0194104 | A1 | 8/2007 | Fukuda et al. | |
| 2014/0131434 | A1 | 5/2014 | Ozakan | |

FOREIGN PATENT DOCUMENTS

| AU | 2012100873 A4 | 7/2012 |
|---|---|---|
| ES | 2 402 814 A2 | 5/2013 |
| GB | 2299074 A | 9/1996 |
| GB | 2438290 A | 11/2007 |
| KR | 10-2007-0021373 A | 2/2007 |
| WO | 2011/150013 A2 | 12/2011 |

OTHER PUBLICATIONS

GB Combined Search and Examination Report application No. GB 1415875.2 dated Jun. 17, 2015.

* cited by examiner

*Primary Examiner* — Sonji Johnson
(74) *Attorney, Agent, or Firm* — Squire Patton Boggs (US) LLP

(57) ABSTRACT

A stock monitoring system, for monitoring items of stock in one or more storerooms, includes a portable device including a first processor and a first wireless transceiver for short-range communication. The first processor is operable for receiving a user ID of a second user via the first wireless transceiver and transmitting to the remote system via a second wireless transceiver, at least item data, associated with the user ID. An intermediate unit includes a second processor and a reader and a wireless transmitter adapted for short-range communication. Upon reading the user ID from an ID card of the second user by the reader, the user ID is transmitted via the wireless transmitter, e.g. for a predetermined period. The first processor receives a user ID of a second user via the first wireless transceiver. A method, portable device and intermediate unit are also disclosed.

20 Claims, 18 Drawing Sheets

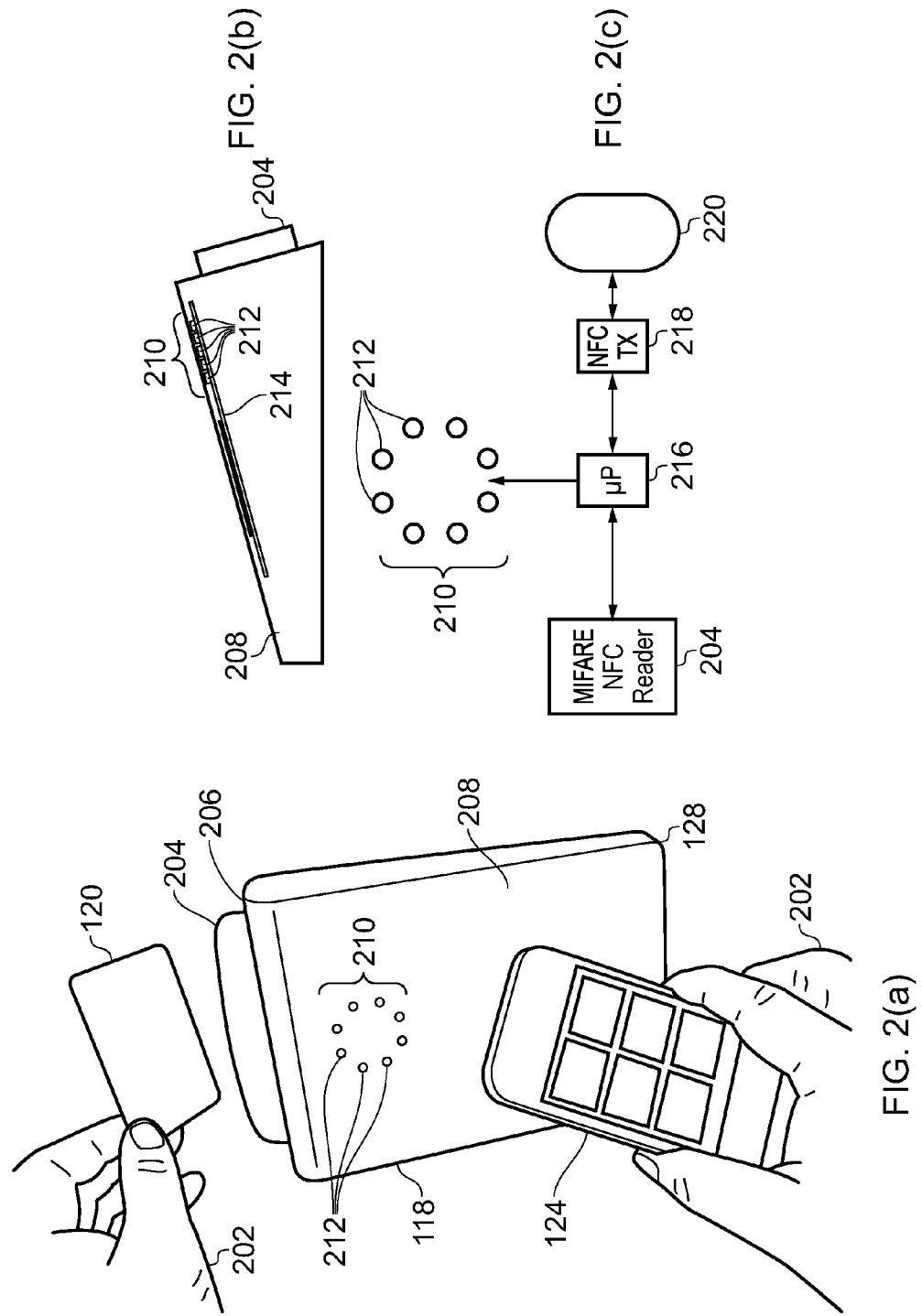

| 332 | 334 | 336 |
|---|---|---|
| INVENTORY TRACKING | | |
| USER 1 | USER 2 | USER 3 |

| UID | PID | QTY | DESCRIPTION | COMMENT |
|---|---|---|---|---|
| 338 | 340 | 342 | 344 | 346 |

SAVE 348  CANCEL 350  CONFIRM 352

STOCK MONITORING

The present invention relates to electrical stock monitoring techniques, and more particularly to improving the accuracy of electronic stock monitoring via communicating devices.

This invention concerns systems and methods for providing monitoring of quantities of stock in an accurate and preferably secure manner, in storage environments where hand-portable stock items can be stored and accessed by a user or, more typically, a multitude of different users or employees. Such storage environments are typically found at manufacturing, construction, aerospace, healthcare and other sites. The stock items may include tools, consumable materials, and single-use and reusable items. As used herein, "item" and "product" may be used interchangeably; and stock item may be referred to generally as "indirect materials" or "inventory":

In prior art systems (see, e.g. GB2299074A, GB2438290A), the amount of stock retrieved or removed from storage has been determined from changes in weight measurements for a bin or container for parts, knowing the unit weight of the part.

However, a problem with such systems is that there is limited visibility and control into where, when and what indirect materials are being used in operations. Inventory may be stored away in multiple untracked locations, usage is not adequately controlled and replenishments are performed reactive, haphazard fashion. This leads to excessive consumption of some materials, and shortages and expediting of other inventory. This in turn results in an increased risk of costly production downtime.

It is known to label and monitor items using barcodes. However, with such systems, care needs to be taken with about bar code orientation, potentially slowing down item issue/return. Further, barcodes are more susceptible to become dirty or torn. Also, barcodes require special readers, providing a high entry level for hardware purchase. In addition, barcodes require on site printing, involving expense for the printers and additional time and cost for on-going maintenance. Another issue is that barcodes are read only—they cannot be repeatedly used. In addition, most barcodes only identify the product type (not uniquely). Due to reading/obscuration issues, barcode reading is not necessarily quick and error free.

One embodiment of the present disclosure provides a stock monitoring system, for monitoring items of stock in one or more storerooms for stock items, data relating to stock items being stored in a database of a first computer system. The stock monitoring system may comprise: a portable device, the portable device including a first processor and, coupled thereto, a first wireless transceiver for short-range communication. The portable device may be adapted to receive user inputs from a first user. The portable device may include a second wireless transceiver, coupled to the first processor, the second wireless transceiver being adapted for long-range wireless communications with a remote system. The first processor may be operable for receiving a user ID of a second user, and receiving one or more further inputs, at least a first input being received via the first wireless transceiver and including item data corresponding to an item. The first processor may be operable for transmitting to the first computer system, remote from the portable device via the second wireless transceiver, at least the item data, associated with the user ID.

In embodiments, the system further comprises an intermediate unit, the intermediate unit including a second processor and, coupled thereto, a reader and a wireless transmitter, the reader and/or wireless transmitter being adapted for short-range communication; wherein the second processor is operable, upon reading the user ID from an ID card of the second user by the reader, for transmitting the user ID user via the wireless transmitter.

In another embodiment of the present disclosure there is provided a portable device for use in a stock monitoring system for monitoring items of stock in one or more storerooms for stock items. The stock monitoring system may include a first computer system, wherein data relating to stock items is stored in a database of the first computer system. The portable device may comprise a first processor and, coupled thereto, a first wireless transceiver and a second wireless transceiver. The first wireless transceiver may be adapted for short-range communication, and the second wireless transceiver may be adapted for long-range wireless communications with the first computer system, remote from the portable device. The portable device may be adapted to receive user inputs from a first user. The first processor may be operable for receiving a user ID of a second user. The first processor may be operable for receiving one or more further inputs, at least a first input being received via the first wireless transceiver and including item data corresponding to an item, and at least a second user input being from the first user and associating the item with the second user. The first processor may be operable for transmitting to the first computer system via the second wireless transceiver, at least the item data, associated with the user ID.

In another embodiment of the present disclosure there is provided an intermediate unit for a stock monitoring system, the stock monitoring system being for monitoring stock items in one or more storerooms. The stock monitoring system may include a first computer system, wherein data relating to stock items is stored in a database of the first computer system. The stock monitoring system may include a portable device, the portable device including a first processor and, coupled thereto, a first wireless transceiver for short-range communication. The portable device may be adapted to receive user inputs from a first user. The portable device may include a second wireless transceiver, coupled to the first processor, the second wireless transceiver being adapted for long-range wireless communications with the first computer system, remote from the portable device. The first processor may be operable for receiving a user ID of a second user. The first processor may be operable for receiving one or more further inputs, at least a first input being received via the first wireless transceiver and including item data corresponding to an item. The first processor may be operable for transmitting to the first computer system, remote from the portable device via the second wireless transceiver, at least the item data, associated with the user ID. The intermediate unit may comprise a second processor and, coupled thereto, a reader and a wireless transmitter, the reader and/or wireless transmitter being adapted for short-range communication. The second processor may be operable, upon reading the user ID from an ID card of the second user by the reader, for transmitting the user ID user via the wireless transmitter.

The first processor may be operable for receiving a user ID of a second user via the first wireless transceiver.

In an alternative embodiment, the second wireless transceiver is coupled to the second processor. The second processor may operable for transmitting to the remote system via the second wireless transceiver, at least the item data, associated with the user ID.

Receiving the first input may comprise receiving the item data following placing of the portable device in the vicinity of a tag, the tag being mounted on or associated with the item and embodying encoded item data corresponding to the item.

The one or more further inputs may include at least a second user input from the first user and associating the item with the second user.

The second processor may be operable for transmitting the user ID user via the wireless transmitter for a predetermined period.

The second processor may be operable for securely erasing the user ID from the first device at the end of the predetermined period;

The second processor may be operable, upon scanning the user ID card of the first user, for extracting the user ID and reformatting the user ID prior to transmission via the wireless transmitter.

The portable device may comprise a PDA having a graphical and/or touchscreen user interface. The user interface may be adapted for displaying as plurality of tabs, each tab corresponding to a user. The first user input may include selection by the first user of a tab corresponding to the second user.

The one or more further inputs may include a third user input being from the first user via the user interface, the third user input commanding the sending of the item data, associated with the user ID, to the remote system.

The reader, wireless transmitter and/or the first wireless transceiver comprise a near field communication (NFC) device.

The second wireless transceiver may be incorporated in the portable device. The second wireless transceiver comprises a cellular transceiver, a 2G cellular transceiver, a 3G cellular transceiver or a 4G cellular transceiver.

The first computer system may be is adapted to store a stock database, the stock database comprising, for each of one or more users, an item list, each item list comprising one or more item codes, item quantities and/or item descriptions, for each of one or more items related to that user.

The or each tag may comprise a NFC RFID tag.

In another embodiment of the present disclosure there is provided a method carried out in a stock monitoring system, for monitoring stock items in one or more storerooms. The method may comprise providing a first computer system, the a first computer system including a database, data relating to stock items being stored in the database. The method may comprise providing a portable device, the portable device including a first processor and, coupled thereto, a first wireless transceiver for short-range communication, the portable device being adapted to receive user inputs from a first user. The method may comprise providing a second wireless transceiver, coupled to the first processor, the second wireless transceiver being adapted for long-range wireless communications with the first computer system, remote from the portable device. The method may comprise operating the first processor for receiving a user ID of a second user. The method may comprise operating the first processor for receiving one or more further inputs, at least a first input being received via the first wireless transceiver and including item data corresponding to an item The method may comprise operating the first processor for transmitting to the first computer system, remote from the portable device via the second wireless transceiver, at least the item data, associated with the user ID.

Preferably, the stock monitoring system further comprises an intermediate unit, the intermediate unit including a second processor and, coupled thereto, a reader and a wireless transmitter, the reader and/or wireless transmitter being adapted for short-range communication; wherein the second processor is operable, upon reading the user ID from an ID card of the second user by the reader, for transmitting the user ID user via the wireless transmitter.

In another embodiment of the present disclosure there is provided a method carried out in a portable device for use in a stock monitoring system, the stock monitoring system being for monitoring items of stock in one or more storerooms for stock items. The stock monitoring system may include a first computer system, wherein data relating to stock items is stored in a database of the first computer system. The portable device may comprise a first processor and, coupled thereto, a first wireless transceiver and a second wireless transceiver. The first wireless transceiver may be adapted for short-range communication. The second wireless transceiver may be adapted for long-range wireless communications with the first computer system, remote from the portable device. The method may comprise receiving one or more user inputs from a first user. The method may comprise operating the first processor for receiving a user ID of a second user. The method may comprise operating the first processor for receiving one or more further inputs, at least a first input being received via the first wireless transceiver and including item data corresponding to an item, and at least a second user input being from the first user and associating the item with the second user. The method may comprise operating the first processor for transmitting to the first computer system via the second wireless transceiver, at least the item data, associated with the user ID.

In another embodiment of the present disclosure there is provided a method carried out in an intermediate unit for a stock monitoring system, the stock monitoring system being for monitoring stock items in one or more storerooms. The stock monitoring system may include a first computer system, wherein data relating to stock items is stored in a database of the first computer system. The stock monitoring system may include a portable device, the portable device including a first processor and, coupled thereto, a first wireless transceiver for short-range communication. The portable device may be adapted to receive user inputs from a first user. The stock monitoring system may include a second wireless transceiver, coupled to the first processor, the second wireless transceiver being adapted for long-range wireless communications with the first computer system, remote from the portable device. The first processor may be operable for receiving a user ID of a second user. The first processor may be operable for receiving one or more further inputs, at least a first input being received via the first wireless transceiver and including item data corresponding to an item. The first processor may be operable for transmitting to the first computer system, remote from the portable device via the second wireless transceiver, at least the item data, associated with the user ID. The intermediate unit may comprise a second processor and, coupled thereto, a reader and a wireless transmitter, the reader and/or wireless transmitter being adapted for short-range communication. The method may comprise operating the second processor for reading the user ID from an ID card of the second user by the reader. The method may comprise operating the second processor for transmitting the user ID user via the wireless transmitter.

The or each method may include operating the first processor for receiving a user ID of a second user via the first wireless transceiver.

In an alternative embodiment, the second wireless transceiver is coupled to the second processor. The or each method may include operating second processor for transmitting to the remote system via the second wireless transceiver, at least the item data, associated with the user ID.

Receiving the first input may comprise receiving the item data following placing of the portable device in the vicinity of a tag, the tag being mounted on or associated with the item and embodying encoded item data corresponding to the item.

The one or more further inputs may include at least a second user input from the first user and associating the item with the second user.

The or each method may include operating second processor for transmitting the user ID user via the wireless transmitter for a predetermined period.

The or each method may include operating second processor for securely erasing the user ID from the first device at the end of the predetermined period;

The or each method may include operating second processor, upon scanning the user ID card of the first user, for extracting the user ID and reformatting the user ID prior to transmission via the wireless transmitter.

The portable device may comprise a PDA having a graphical and/or touchscreen user interface. The or each method may include operating the user interface for displaying as plurality of tabs, each tab corresponding to a user. The first user input may include selection by the first user of a tab corresponding to the second user.

The one or more further inputs may include a third user input being from the first user via the user interface, the third user input commanding the sending of the item data, associated with the user ID, to the remote system.

The reader, wireless transmitter and/or the first wireless transceiver comprise a near field communication (NFC) device.

The second wireless transceiver may be incorporated in the portable device. The second wireless transceiver comprises a cellular transceiver, a 2G cellular transceiver, a 3G cellular transceiver or a 4G cellular transceiver.

The first computer system may be is adapted to store a stock database, the stock database comprising, for each of one or more users, an item list, each item list comprising one or more item codes, item quantities and/or item descriptions, for each of one or more items related to that user.

The or each tag may comprise a NFC RFID tag.

In another embodiment of the present disclosure there is provided a recordable, rewritable or recorded medium having recorded or stored thereon machine readable data defining or transformable into instructions for execution by processing circuitry and corresponding to at least the steps of the methods set out in any of the appended claims or recited hereinabove.

Implementation of the processing on the PDA (which is e.g. phone or tablet with NFC-RFID (Near Field Communication Radio Frequency Identification) capability) may be by means of an application (e.g. Android App) that is downloaded to the PDA. The App may be linked in real time through 3G to cloud-based central computer (CC) software. The central computer (CC) software may be an enterprise-wide indirect materials management platform.

According to embodiments of the invention are provided an NFC RFID reading and translation device (intermediate unit). It may read the operator-specific clock cards and convert this into an NFC RFID reading that the NFC device on the PDA can read.

Using techniques according to embodiments of the invention enables operators of storerooms or storage sites for stock items to effectively manage and control usage of indirect materials in those storeroom environments. Embodiments provide real-time enterprise-wide visibility and control over indirect materials.

Techniques according to embodiments of the invention enable reliable, error-free capture of user ID and consequent accurate allocation of removed/returned stock items to users.

In embodiments, the storeman is freed to be mobile while capturing user IDs and scanning products/items to be issued/returned; remote reporting of product issue (e.g. via 3G) can occur in parallel with scanning user ID/item data for the next user, speeding up issue of materials/items to, and return by, users. Productivity in a construction/manufacturing environment may be increased.

Techniques according to embodiments of the invention enable low-touch data transfer, avoiding wear and/or misreads on entities normally encoding item data for an item.

Using techniques according to embodiments of the invention may afford up to 20% reduction in indirect material spend, up to 50% reduction in indirect material inventory, up to 50% reduction in procurement costs, reduced risk of downtime and/or increased visibility of material usage.

Compared to traditional barcode-based systems, techniques according to embodiments of the invention can involve numerous advantages, as follows.

1. Process is quicker—No need for the stores person to worry about bar code orientation.

2. More robust and less costly to maintain after setup—barcodes are more susceptible to become dirty or torn. NFC RFID tags according to embodiments of the invention have a resin cover to protect the NFC label from being torn and will continue to work even if dirty.

3. Relatively low cost of readers and 3G real time communication of inventory transactions—NFC RFID reading capability is included in many Android Smartphones and Tablets so has a low entry level for hardware purchase.

4. No cost of printers and on-going maintenance cost—barcodes require on site printing. NFC RFID tags can be stocked and the product code written to the tag so no on site printers are required.

5. RFID tags can be used again and again—with authorised password via product codes on tags can be changed. RFID tags are read/write, barcodes are read only.

6. RFID tags can identify individual items if required—e.g. serial number. Most barcodes only identify the product type (not uniquely)

7. Process is quick and error free, saving time and money over barcode applications. There is also the ability for allocation of lists of parts to users through one touch RFID from the user and one touch RFID from the storeman with the PDA through the intermediate unit.

Embodiments of the invention will now be described in detail, by way of example, with reference to the accompanying drawings, in which:

FIG. 1 is a schematic overview of the stock monitoring system according to an embodiment of the invention;

FIGS. 2(a)-2(c) illustrate the converter 118 of FIG. 1-FIG. 2(a) in a perspective view showing interaction with other devices, FIG. 2(b) in a lateral cross-sectional view and FIG. 2(c) schematically showing the internal electronics;

FIG. 3(b) shows an example of a user interface displayed on touchscreen 126 of PDA 124, according to an embodiment of the invention;

Figure 1:
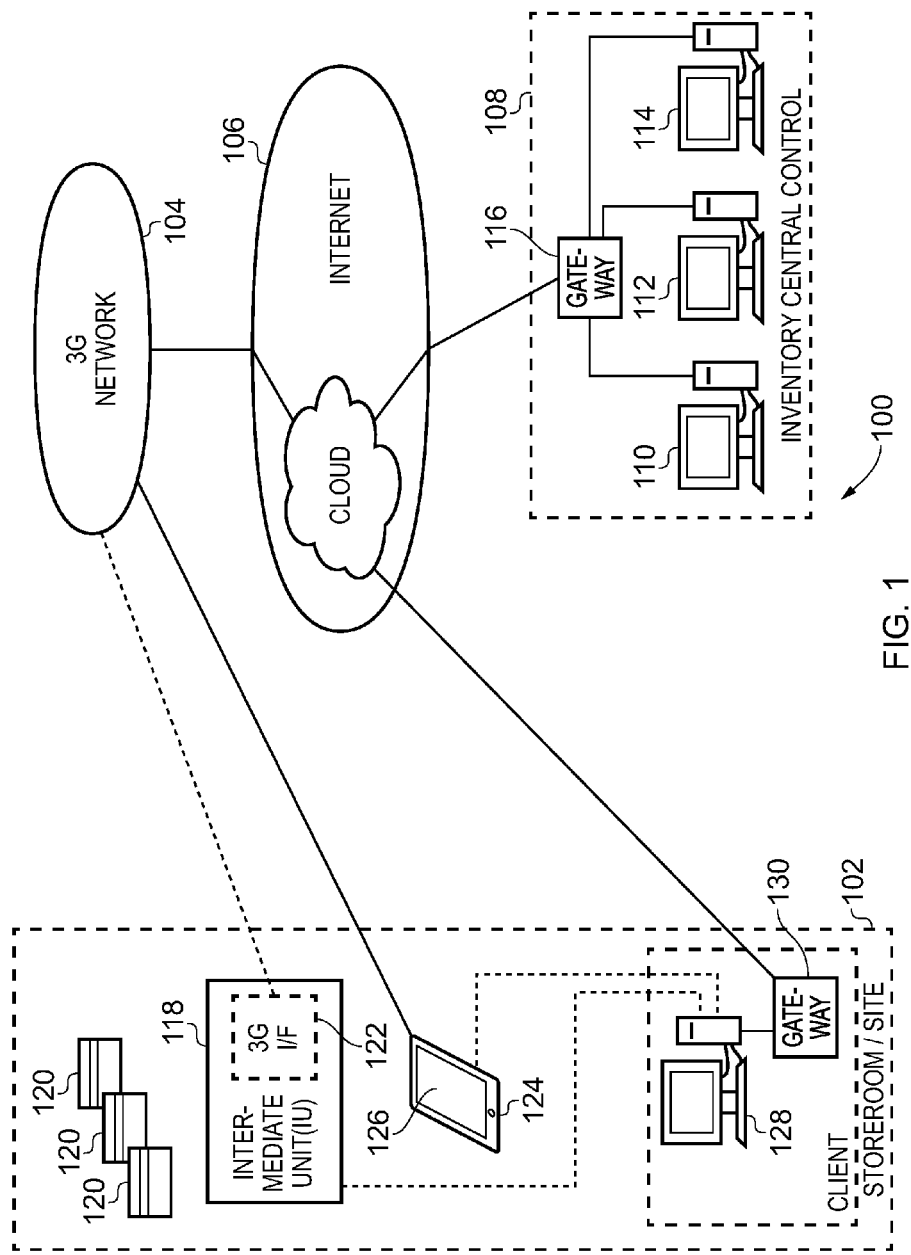
Figure 5:
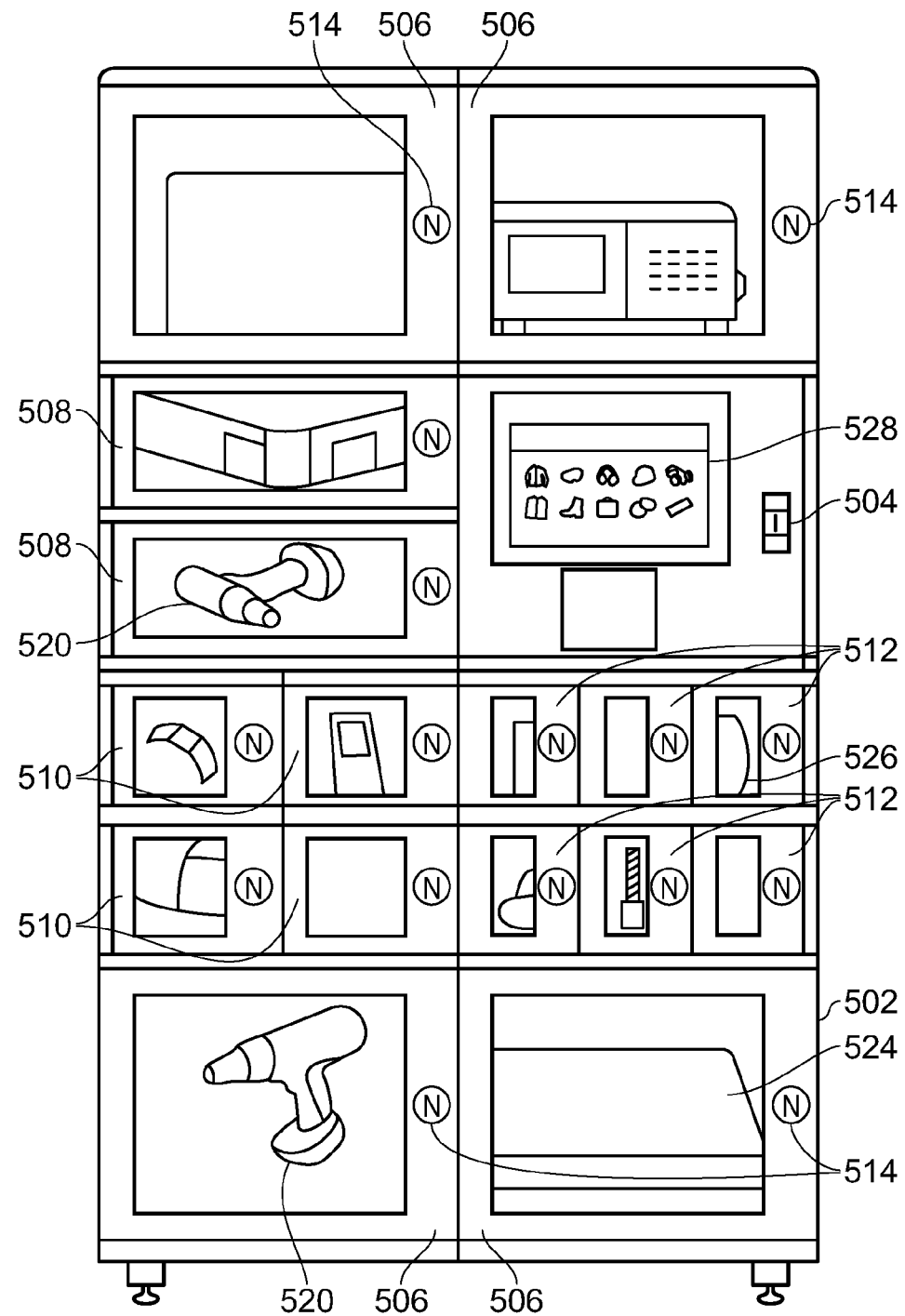
Figure 7A:
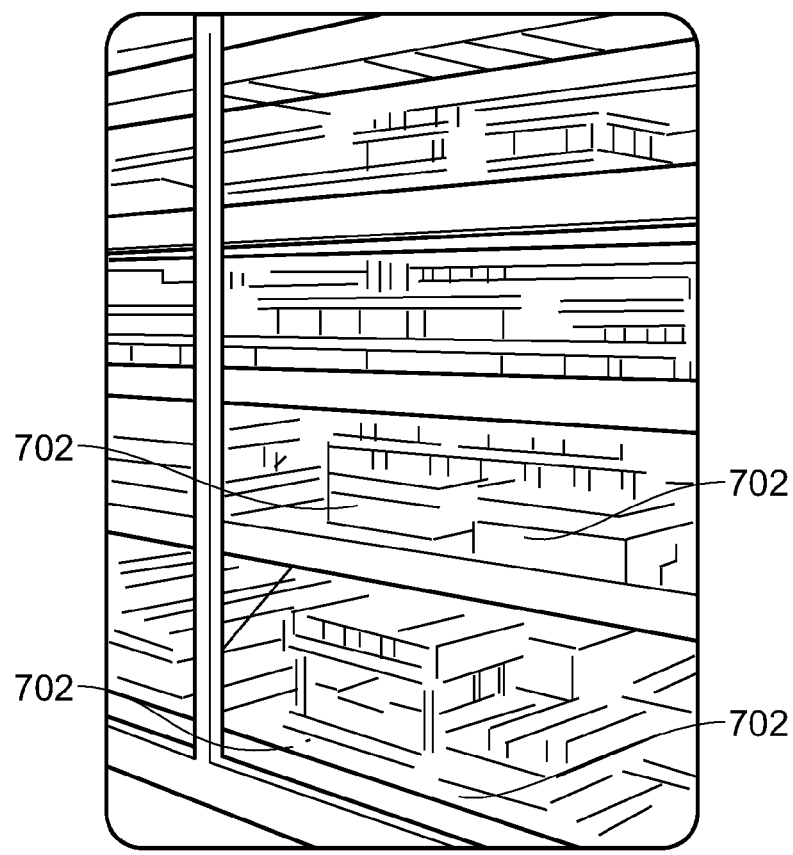
Figure 7B:
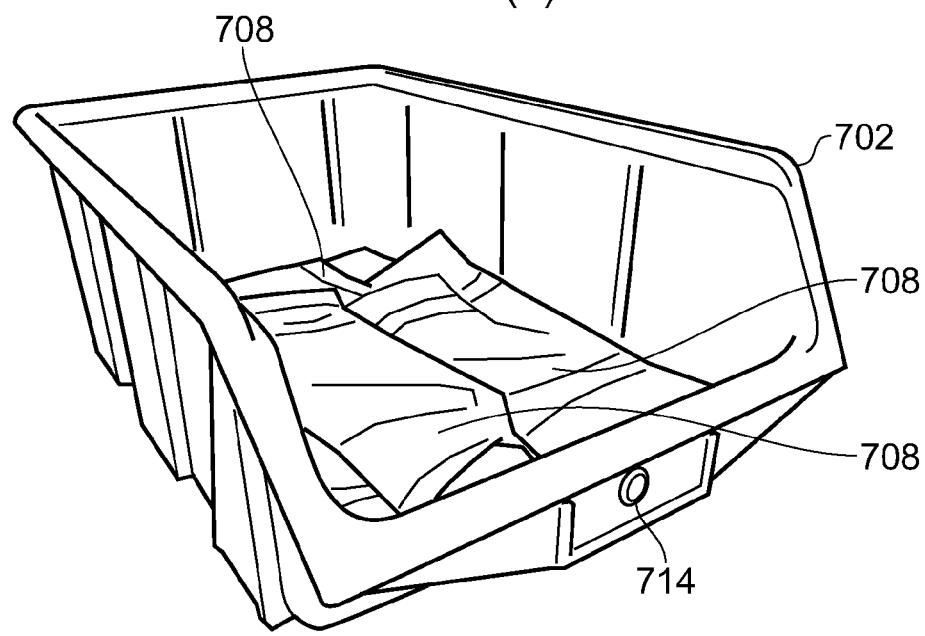
Figure 8:
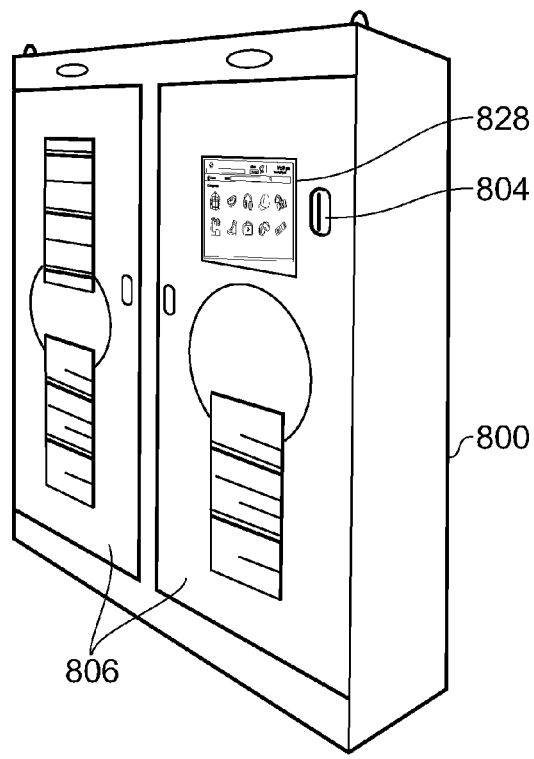
Figure 9:
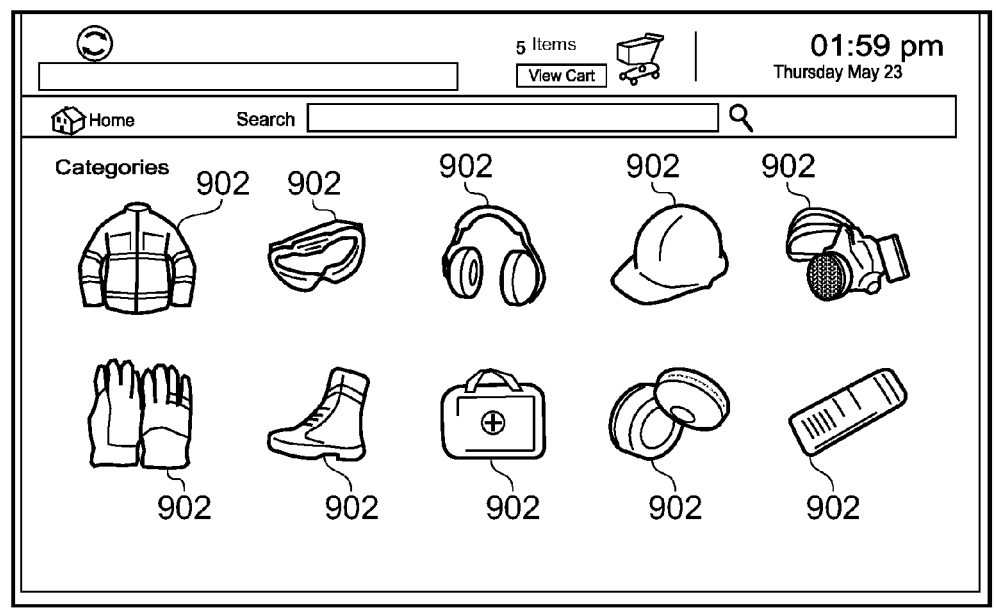

FIGS. 4(a)-4(g) show the processing steps carried out at the intermediate unit 118 (IU), PDA 124 and central computer (CC) 108 in the system of FIG. 1;

FIG. 5 shows a storage cabinet for the storage of items according to embodiments of the invention;

FIGS. 6(a)-6(d) show a system for dispensing of items in another embodiment of the invention, in a manner similar to a vending machine;

FIGS. 7(a) and 7(b) show a storage arrangement within a store room in an alternative embodiment of the invention;

FIG. 8 shows an item dispensing system 800 according to another embodiment of the invention; and FIG. 9 shows in more detail the user interface 828 of the dispensing system 800 of FIG. 8.

In the following, like numerals will be used to denote like elements. Certain techniques disclosed in GB2299074A and/or GB2438290A may be employed in implementing the present invention, as appropriate, except as described hereinafter.

FIG. 1 is a schematic overview of the stock monitoring system according to an embodiment of the invention. The system 100 includes a number of devices located at a storeroom or store site 102 at which items of stock such as tools, consumables, medication, etc. are stored by means of cabinets, shelving and the like (not shown). Devices at the storeroom site 102 are coupled via a cellular network, such as 3G network 104 and via the internet, generally designated 106 to a remote system generally designated 108. The remote system, hereafter referred to as central computer 108, may comprise one or more computer systems 110-114; and these are linked to the internet 106 via gateway 116. Central computer 108 may include a database (not shown) storing, for each storeroom 102 (of which there may be a multitude), tables of items stored at that site, as well as, for each item, the quantity currently stored, a unique item code, and a description or other information relevant to the item. The database may also include records for each user that has used the storeroom 102, or each user that is registered with the overall system 100, a record of those items that have been taken out of the storeroom by the user, and/or returned to the storeroom by the user.

At the storeroom/site 102, an intermediate unit intermediate unit 118 is provided; and, as discussed in further detail herein below, intermediate unit 118 includes a card reader (not shown) adapted to read a user ID from a user card 120. Each user card 120 has embodied therein a user ID unique to a user of the system 100. Optionally, intermediate unit 118 includes a 3G interface 122 for communication with central computer 108 via 3G network 104.

As discussed in further detail below, at each storeroom/site 102, at least one storeman (not shown) operates a personal digital assistant (PDA) 124 in conjunction with intermediate unit 118, for checking in, checking out, or otherwise monitoring or updating stock items in the storeroom 102 based on interactions with a user having a user card 120. As is known, PDA 124 is preferably of the type having a touchscreen display 126 for receiving inputs from the storeman, as well as a cellular 3G interface for communicating with central computer 108 via 3G network 104. The PDA 124 may have a keyboard or touch screen via which the user can enter commands, with options being displayed to the user (e.g. via Windows, Icons, Menus and Pointers) in conventional user interface (UI) fashion. PDA 124 suitably runs UI software for this purpose. PDA 124, although referred to as a personal digital assistant, may comprise a smartphone, tablet or laptop computer or the like.

Optionally, a client computer system 128 may be provided at storeroom/site 102, the client computer 128 being able to communicate with central computer 108 via gateway 130 and internet 106. In embodiments, intermediate unit 118 and/or PDA 124 are additionally coupled to client computer 128, e.g. via a wireless LAN or Wi-Fi system.

FIGS. 2(a)-2(c) illustrate the intermediate unit 118 of FIG. 1-FIG. 2(a) in a perspective view showing interaction with other devices, FIG. 2(b) in a lateral cross-sectional view and FIG. 2(c) schematically showing the internal electronics. In operation, upon presentation by a user (not shown) of their user card 120 at a store, the storeman 202 presents the user card 120 to a card reader 204 disposed on the upper side 206 of intermediate unit 118. Card reader 204 is preferably of the near field communication (NFC) type and is for example an encrypted card reader available under the trade name MIFARE. Thereafter, the user ID embodied in user card 120 is extracted and processed as described in further detail below.

On the front surface 208 of converter 118 is provided display 210, for example in the form of a tricolour LEDs 212.

As discussed further below, during operation, shortly after presentation of user card 120, the PDA 124 is also presented to front surface 208 of the intermediate unit 118 by the store man 202; this enables transfer of information related to the user, including unique user ID (number) to the PDA 124.

Referring to FIGS. 2b and 2c, mounted inside intermediate unit 118, and preferably adjacent the front surface 208, is a PCB 214 on which a first microprocessor 216 is disposed. Coupled to first microprocessor 216 is reader 204 and an NFC transmitter 218, which transmits signals via NFC antenna 220.

Figure 3A:
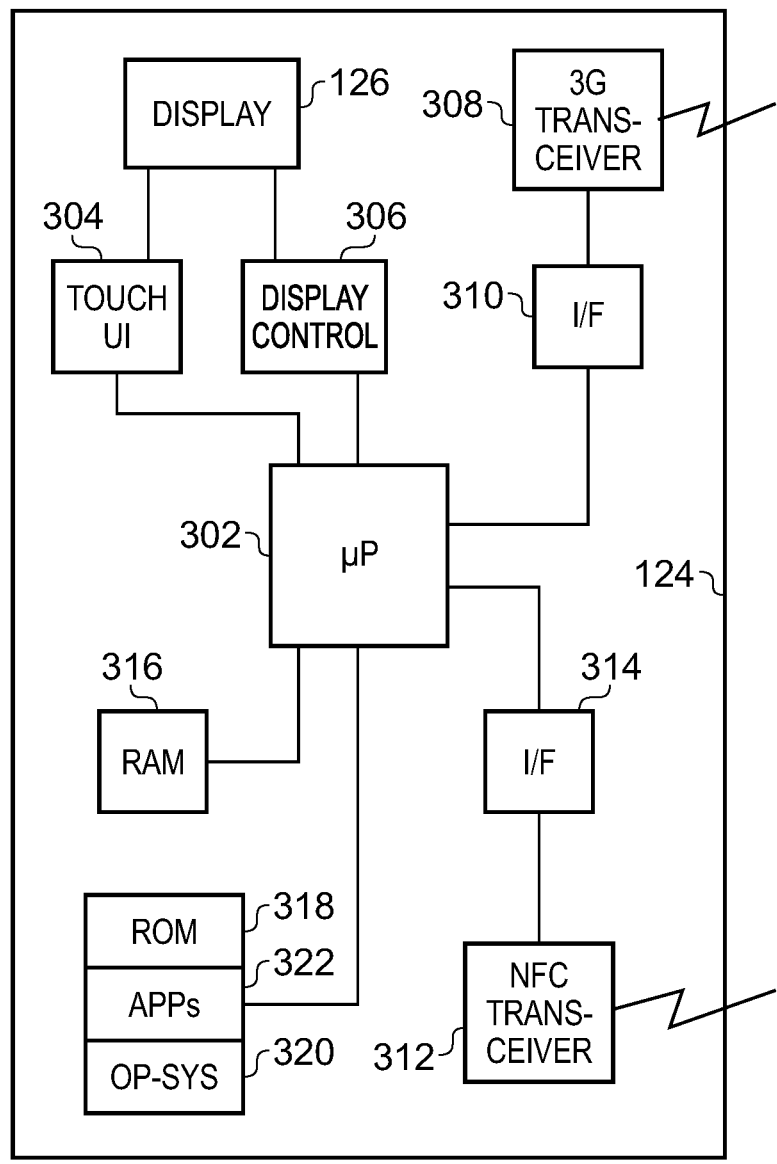
FIG. 3(a) shows a schematic diagram of the internal electronics of PDA 124 of FIG. 1.

FIG. 3(a) shows a schematic diagram of the internal electronics of PDA 124 of FIG. 1, and FIG. 3(b) shows an example of a user interface displayed on touchscreen 126 of PDA 124, according to an embodiment of the invention. As seen in FIG. 3a, PDA 124 includes a second microprocessor 302 coupled to touchscreen 126 via, where required, a touch gesture processing interface 304 and a display controller 306. In this embodiment, PDA 124 has cellular (3G) communications capabilities, provided by 3G transceiver 308 via, where necessary, first ND interface 310. Further, in this embodiment, PDA 124 is provided with NFC communications capabilities by means of NFC transceiver 312 coupled, where necessary, via second ND interface 314 to second microprocessor 302. Finally, as is well known in the art, second microprocessor 302 is further coupled to RAM 316 and ROM 318. The latter is non-volatile memory storing operating system software 320 and application software. In the present embodiment, application software comprises an inventory tracking or monitoring App 322 by means of which a storeman may interact with PDA 124 for the transfer of data to and from central computer 108 of FIG. 1.

Referring to FIG. 3b, displayed on touchscreen 126 of PDA 124 is the user interface, generally designated 330, of the inventory tracking/monitoring App 322. The user interface 330 may include a number of tabs 332, 334, 336, each tab corresponding to a different user. For each user (in this case details for "User 2" are illustrated), there are presented in tabular form details of products checked out (taken) or checked in (returned) by user 2. The details include user ID (UID) in column 338, item or product ID (PID) in column 340, quantity (QTY) in column 342, DESCRIPTION in column 344 and COMMENTS in column 346. At the bottom of user interface 330 are provided buttons 348, 350 and 352, the latter comprising a "Confirm" button enabling the storeman to confirm the items taken out or returned according to the displayed information, thus causing transmission of this item related data to central computer 108.

FIGS. 4(a)-4(g) show the processing steps carried out at the intermediate unit (IU) 118, PDA 124 and central computer 108 (CC) in the system of FIG. 1.

Figure 4A:
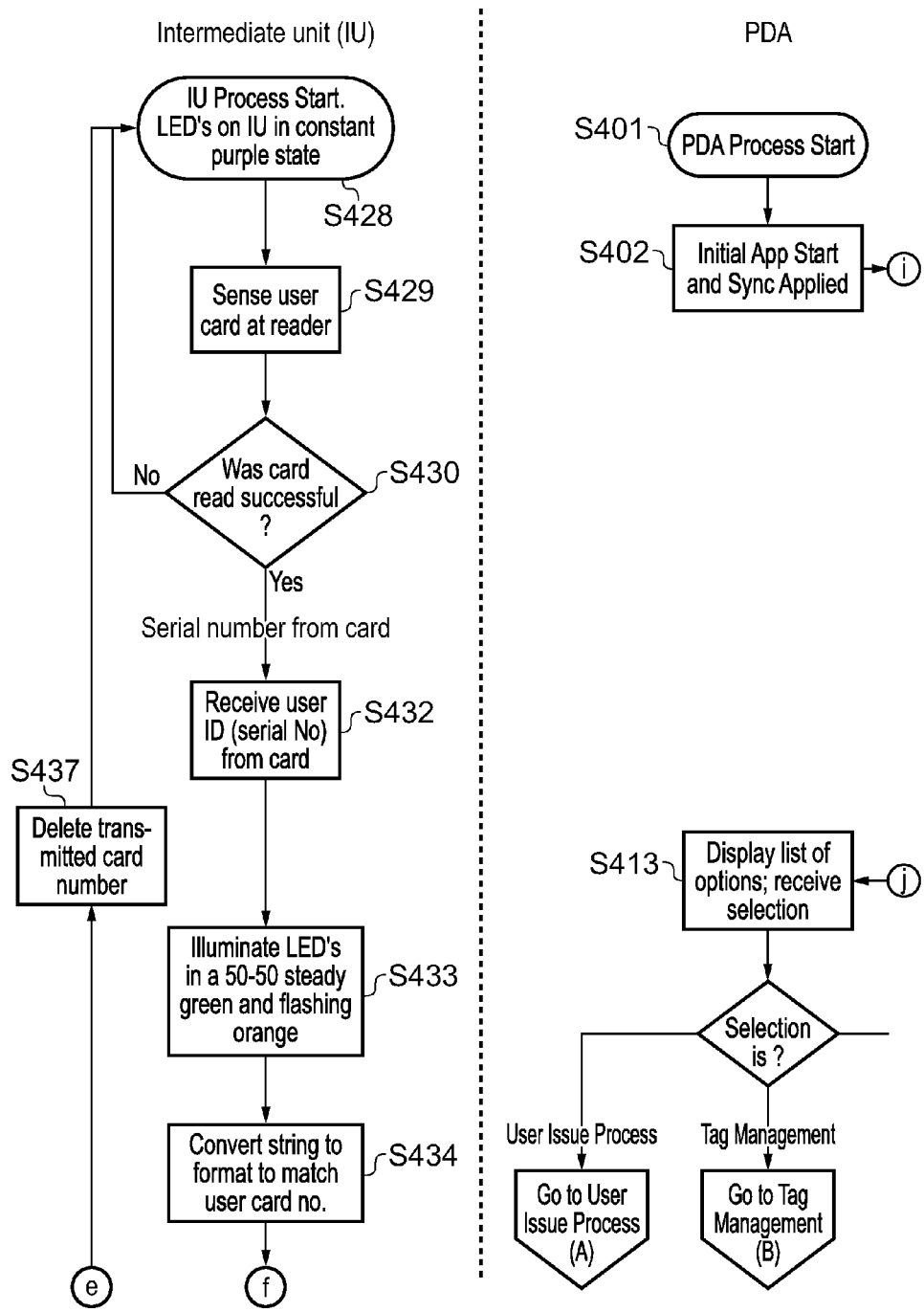
Figure 4A:
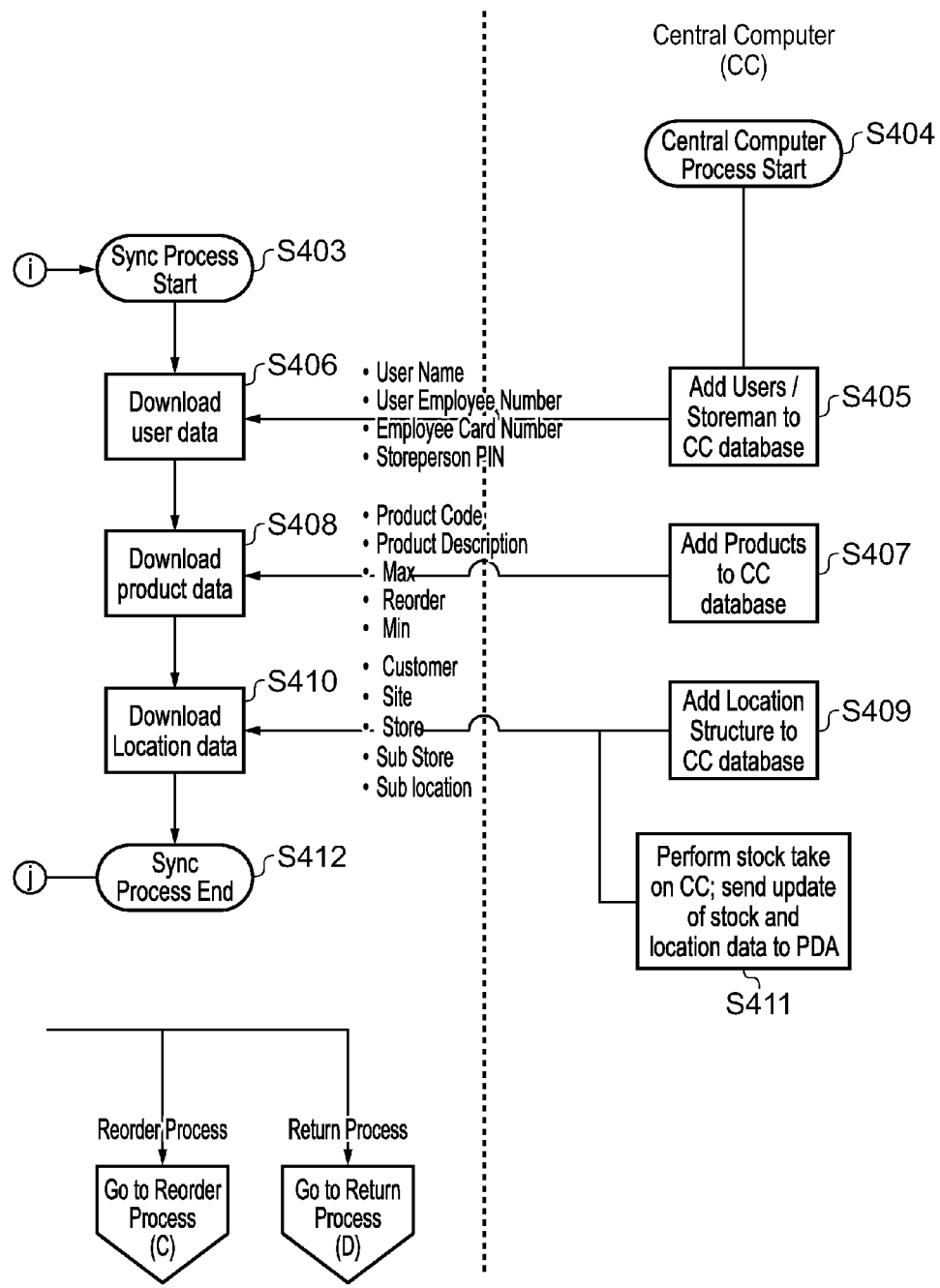

Referring to FIG. 4a, the process start for the stock monitoring and control app 322 (FIG. 3a) is indicated at s401. At first, the app 322 is initialized (s402), and a sync process applied. Following the sync process start (s403), at this point, the CC process has started (s404). The sync process on PDA 124 is such that if data relating to a storeman or additional users have been added (s405) to the CC database, such user data is downloaded (s406), the data comprising, for example, User Name, User Employee Number, Employee Card Number, and/or Storeman PIN. Further, in the event that additional products have been added to the CC database (s407), the corresponding product data is downloaded (s408) to the PDA, the product data comprising, for example, Product Code, Product Description, Max., Reorder (level), and/or Min. Finally, in the event that a new location structure (i.e. details of a store location and the structure thereof) has been added (s409) to the CC database, such location data are downloaded (s410) to the PDA, the location data comprising, for example, Operator (i.e. entity name), Site, Store, Sub Store, and/or Sub Location. With regard to the latter step (s410), a similar operation is applied in the event that, at CC 108, a stock take has been performed resulting in the transmission (s411) of an update of stock location and location data to the PDA 124.

Once the sync process has ended (s412), a list of options is displayed on the PDA and a selection by the store man is received (s413). Depending on the selection that is input, the App 322 may then proceed to execute a User Issue Process (A), a Tag Management Process (B), a Reorder Process (C) or a Return Process (D), as discussed further hereinbelow.

Figure 4B:
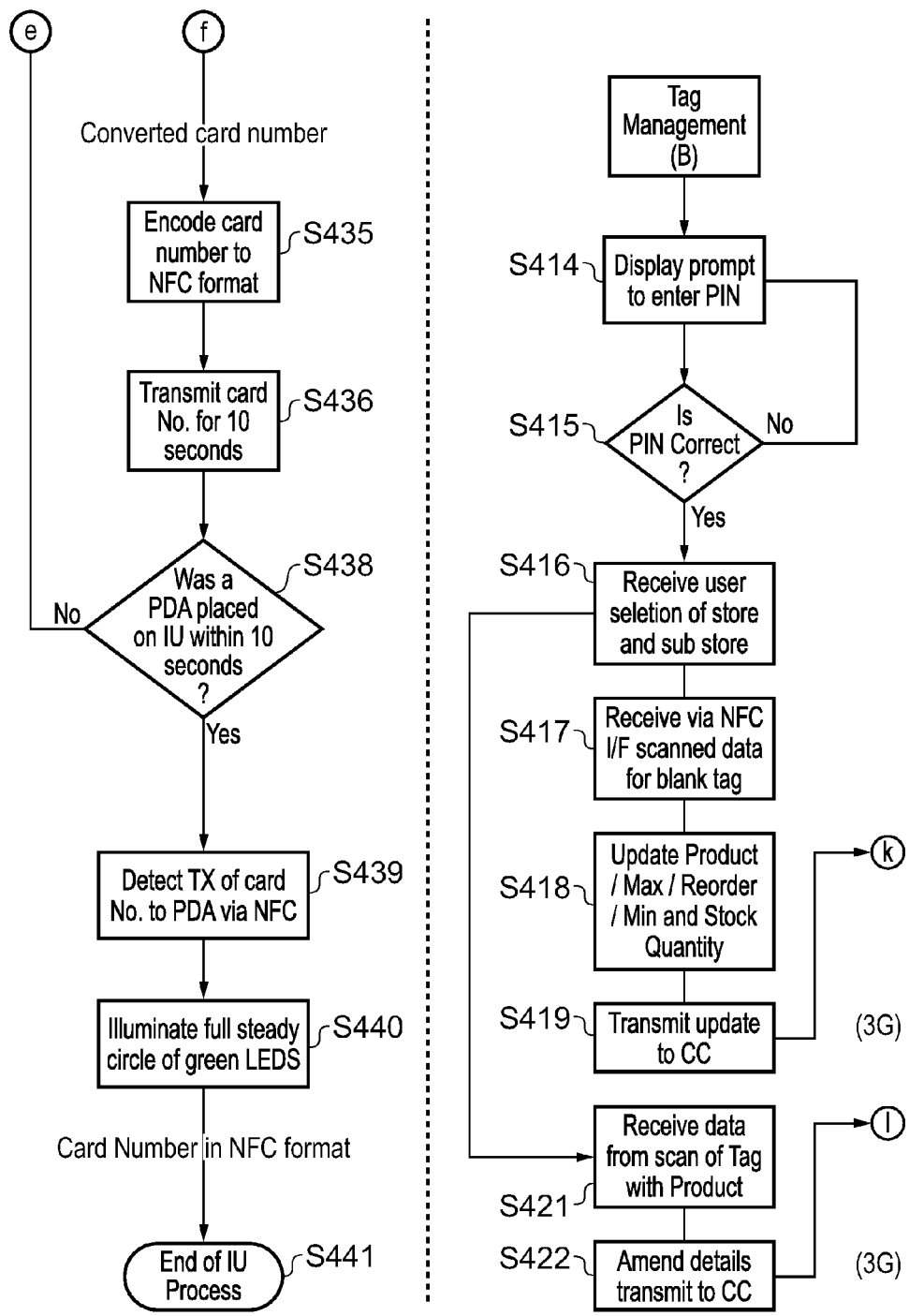
Figure 4B:
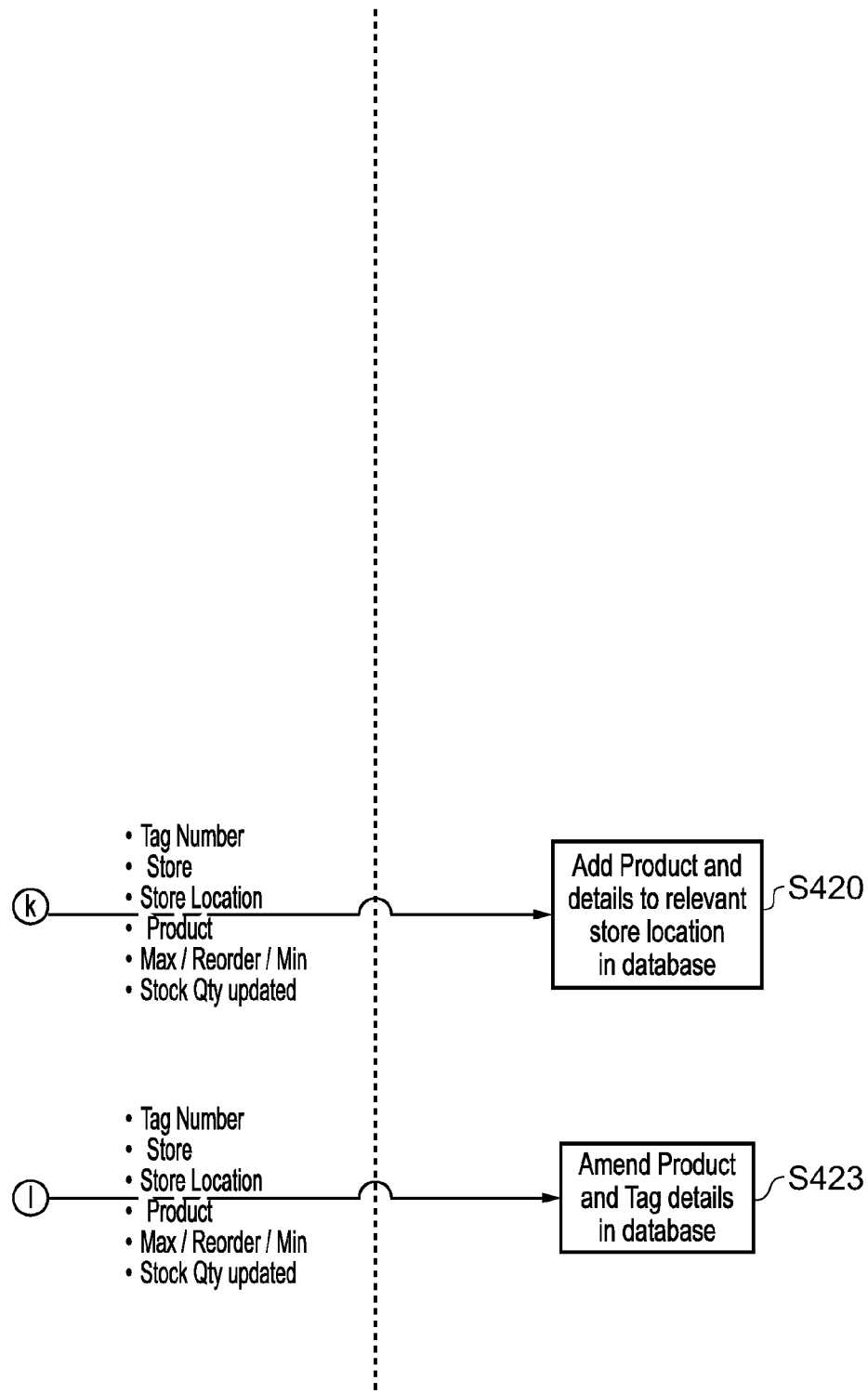

Referring to FIG. 4b, the Tag Management process (B) is there indicated. First, a prompt is displayed for the store man to enter a PIN (s414). Once it is determined (s415) that a correct PIN has been entered, selections are received (s416) from the store man of a store and sub store via UI 126. In preferred embodiments, data on products or items are encoded as NFC-RFID tags mounted on, attached to, or otherwise associated with a respective product or item. As part of the Tag Management process, i.e. for adding products at the given store location to the central computer database, the storeman may scan a blank tag for the product (s417), whereby the PDA receives the relevant data on the product via NFC transceiver 312 (FIG. 3a). The PDA may then receive (s418) from the storeman, in respect of the product tag that has been scanned, quantities or levels for maximum, reorder, minimum and actual stock quantity levels. The updated product data may then be transmitted to CC 108 at s419 (e.g. via 3G cellular transceiver 308 (FIG. 3a) of PDA 124). As a result, CC 108 receives the updated data and adds the product data and data relevant to store location to its database (s420).

Further, after selection of store and sub store at s416, upon scan of a tag associated with (e.g. attached to) a product, the PDA receives the relevant product data via NFC transceiver 312 (s421), and then, upon amendment of product details by the store man at s422, the amended data is transmitted (e.g. via 3G cellular transceiver 308 (FIG. 3a)) to CC 108. Thereupon, the product and tag details corresponding thereto are amended in the database of CC 108 at s423.

Figure 4C:
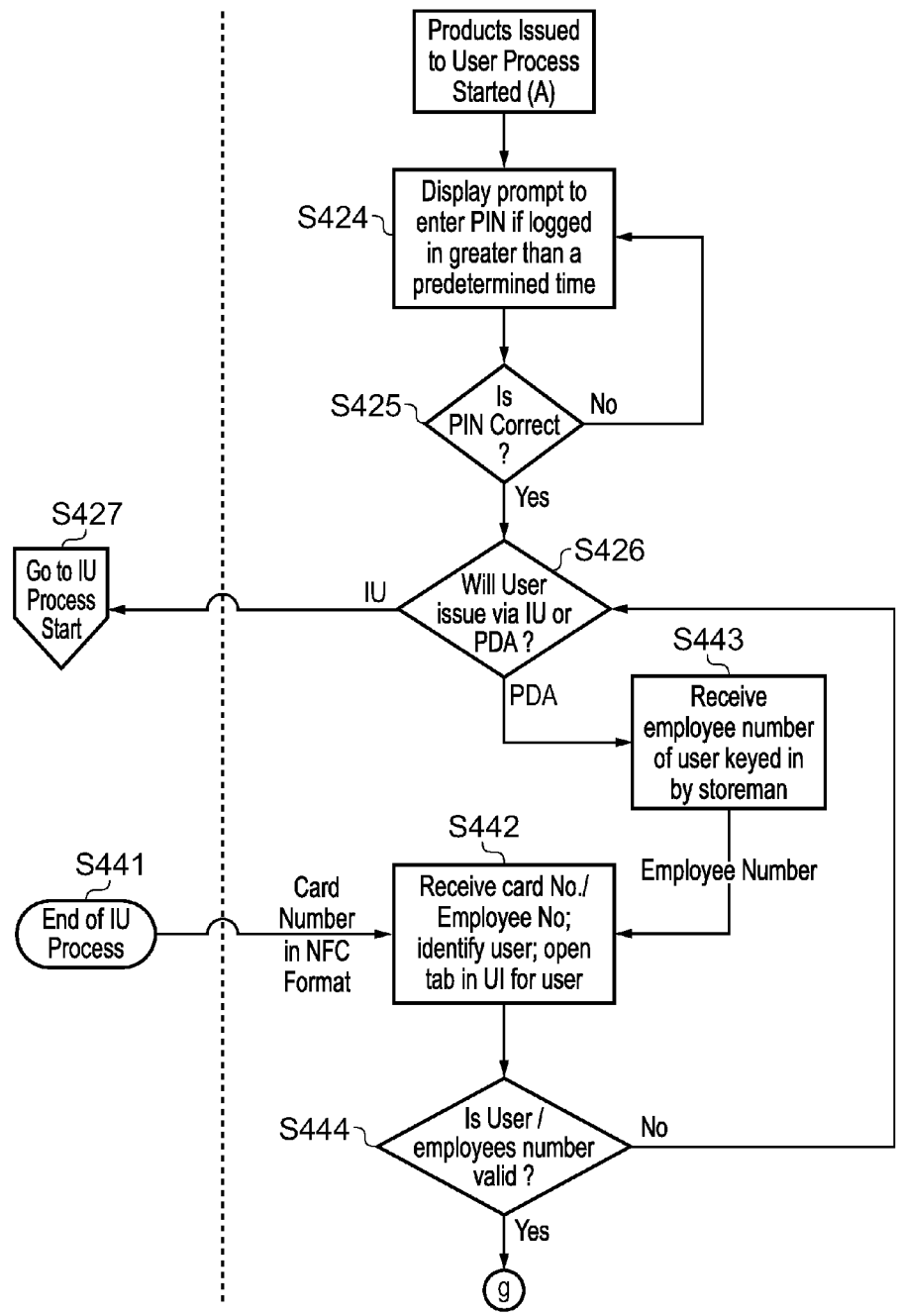

Referring to FIG. 4c, the (Products) Issue to User process (A) is there illustrated. Initially, at s424, if the store man has been logged in greater than a predetermined time (e.g. 3 minutes), a prompt is displayed for the PIN to be re-entered. Once it is determined (s425) that a correct PIN has been entered, a determination is made (s426) as to whether the issue of products to the user is with reference to data from intermediate unit 118 or directly to the PDA. That is, the storeman may select the appropriate button on user interface 126 to select between IU 118 and PDA 124.

In the event that IU has been selected, processing reverts (s427) to the IU process start in FIG. 4a, left hand column. The process start is indicated at s428 in FIG. 4a. First, the presence of a (transmitting) user (ID) card is sensed at reader 204 (FIG. 2a) at s429. If a card read is unsuccessful, processing returns to s428. If it is determined (s430) that a read of the user card was successful, the serial number of the card is extracted from the card (s432). On successful read of the user ID (serial) number, the LEDs 212 of display 210 (FIG. 2a) are illuminated in a 50/50 steady green and flashing orange state (s433). Then, the received string resulting from the card read is converted to a format to match the user card number at s434. Continuing on FIG. 4b, having converted the card number, the card number is then encoded to NFC format at s435. Once encoded, the card number is transmitted via NFC transmitter 218 and antenna 220 of IU (FIG. 2c). The card number is transmitted (s436) for ten seconds in this embodiment. If no (storeman-operated) PDA is placed in the proximity of (front surface 208) of IU 118 (and therefore an NFC antenna 220) (FIG. 2a) within the ten seconds, the card data that has been transmitted is then deleted at s437 and processing returns to s428. It will be appreciated that periods greater or less than 10 seconds may be implemented.

On the other hand, if it was determined (s438) that the storeman-operated PDA was placed proximate to the IU 118 within ten seconds, the card number is transmitted to the PDA and this is detected at s439. At this point, LEDs 212 of display 210 (FIG. 2a) are illuminated as a full steady circle of green (s440). This marks the end (s441) of the IU process, and the card number (user ID) in NFC format is available for other components within the system.

More particularly, the end of the IU process results in the card number in NFC format being received (s442) at PDA 124 (FIG. 4c).

Referring to FIG. 4c, if the selection determined at s426 is that of PDA entry, the PDA receives the employee number of the user as keyed in by the storeman (s443).

As a result, the card number or employee number have been received (s442) at the PDA. Then, these numbers are used to identify the user, and a tab (FIG. 3b) is opened in UI 126 for the relevant user. At this point, it is determined (s444) whether or not the user/employee number is valid; and if not, processing returns to s426.

Figure 4D:
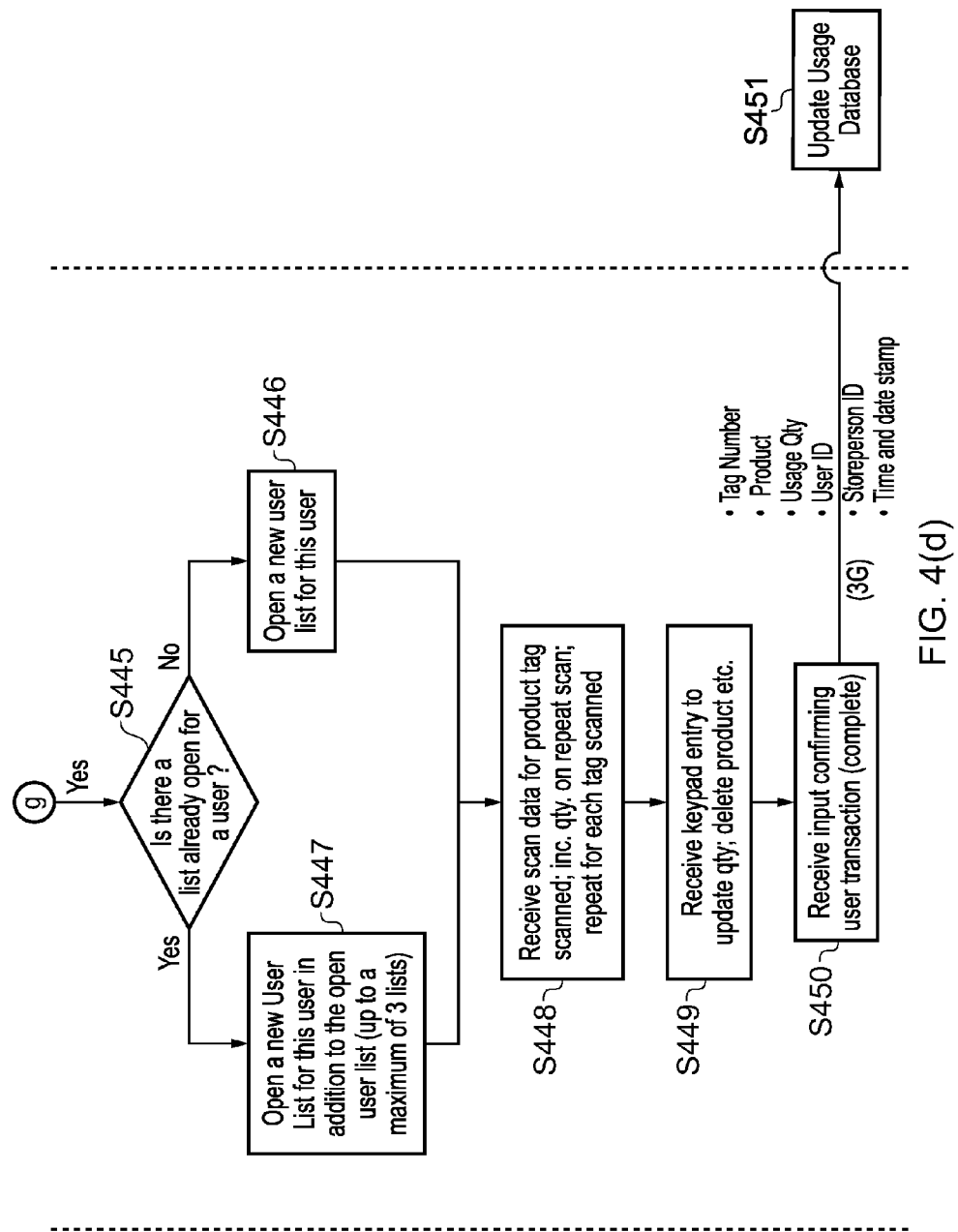

If the user/employee number is valid, processing continues as indicated in FIG. 4d. It is determined (s445) whether there is already a list open for the relevant user (see FIG. 3b). If not, a new user list is opened (s446) for this user. If, on the other hand, there is a list already open for this user, a new user list is opened (s447) for this user in addition to the open user list. With respect to the latter, in this embodiment, up to three user lists may be open for a particular user.

At this point, the store man begins to scan the (NFC-RFID) tags or products to be added to the user list. Thus, by scanning PDA 124 over the tag and receiving data via NFC transceiver 312 (FIG. 3a), PDA 124 receives (s448) scan data for the product associated with the tag and the details appear in the user list. (Upon the same tag being scanned multiple times, the quantity is simply incremented; and for each product whose tag is scanned, the details are added to the list, incremented in quantity if necessary.) Optionally, at this point, for a given state of the user list, the storeman may make manual entries to the list (s449), e.g. to update or correct quantities, delete products from the list etc. Once all products have been scanned and the lists are complete (and/or corrected), PDA 124 receives an input from the storeman (button press) confirming that the user transaction is complete, at s450. As a result, data is transferred (e.g. via 3G transceiver 308 (FIG. 3*a*)) to CC 108, whereupon the database of CC 108 is updated with the confirmed usage data at s451. The data transmitted at s450 may include time and date stamp, storeman ID, user ID, and, for each product in the user list, tag number, product and usage quantity.

Figure 4E:
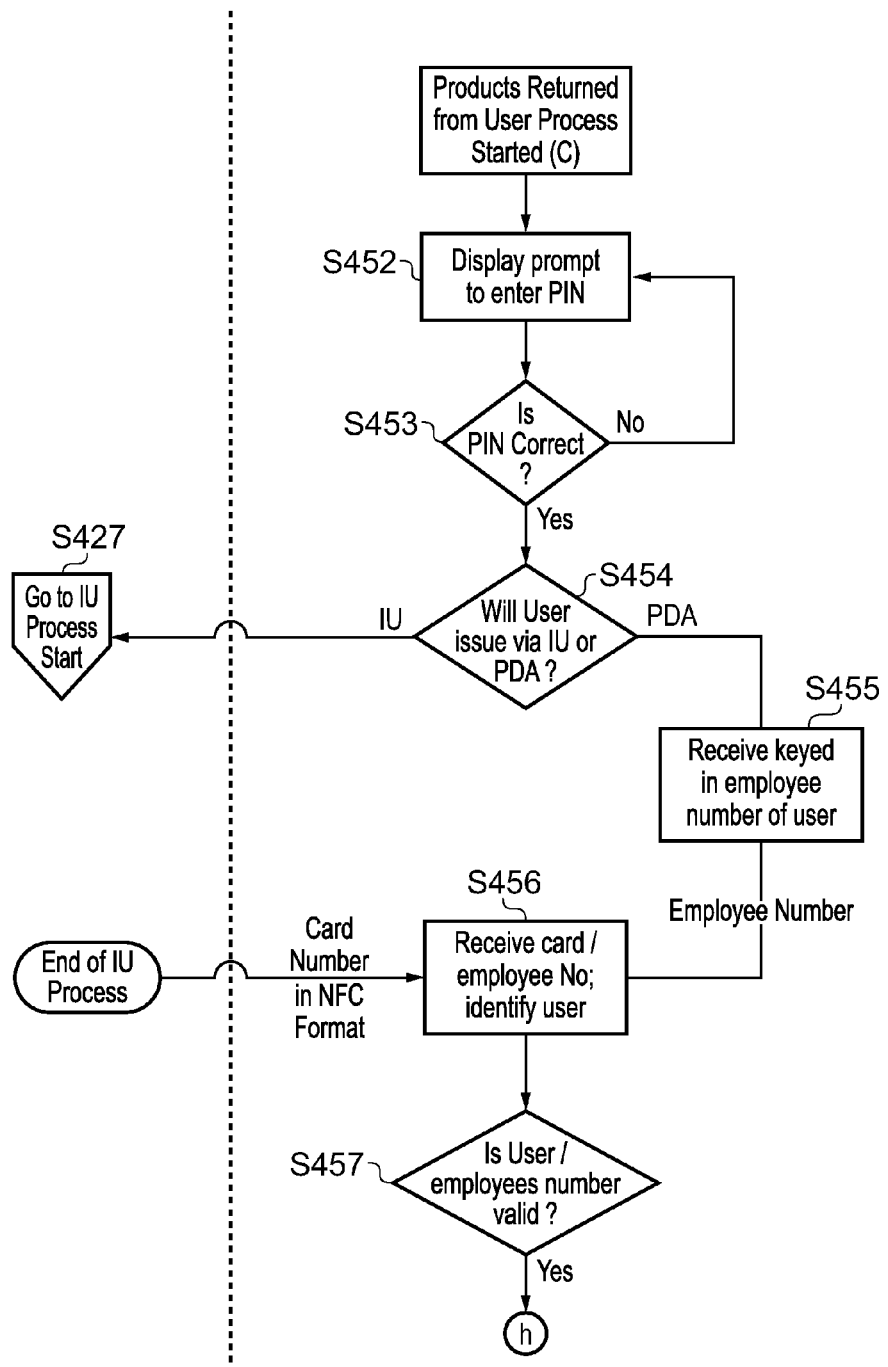

Referring to FIG. 4*e*, the products returned from user process (C) is there illustrated. Initially (s452), a prompt is displayed for the storeman to enter a selection. Then, a determination is made (s454) as to whether the issue of products to the user is with reference to data from intermediate unit 118 or directly to the PDA. That is, the storeman may select the appropriate button on user interface 126 to select between IU 118 and PDA 124.

In the event that IU 118 has been selected, processing reverts (s427) to the IU process start in FIG. 4*a*, left hand column: see above description relating to FIG. 4(*a*).

On the other hand, if the selection determined at s454 is that of PDA entry, the PDA receives the employee number of the user as keyed in by the store man (s455).

As a result, the card number or employee number have been received (s456) at the PDA. Then, these numbers are used to identify the user, and a tab (FIG. 3*b*) is opened in UI 126 for the relevant user. At this point, it is determined (s457) whether or not the user/employee number is valid; and if not, processing returns to s454.

Figure 4F:
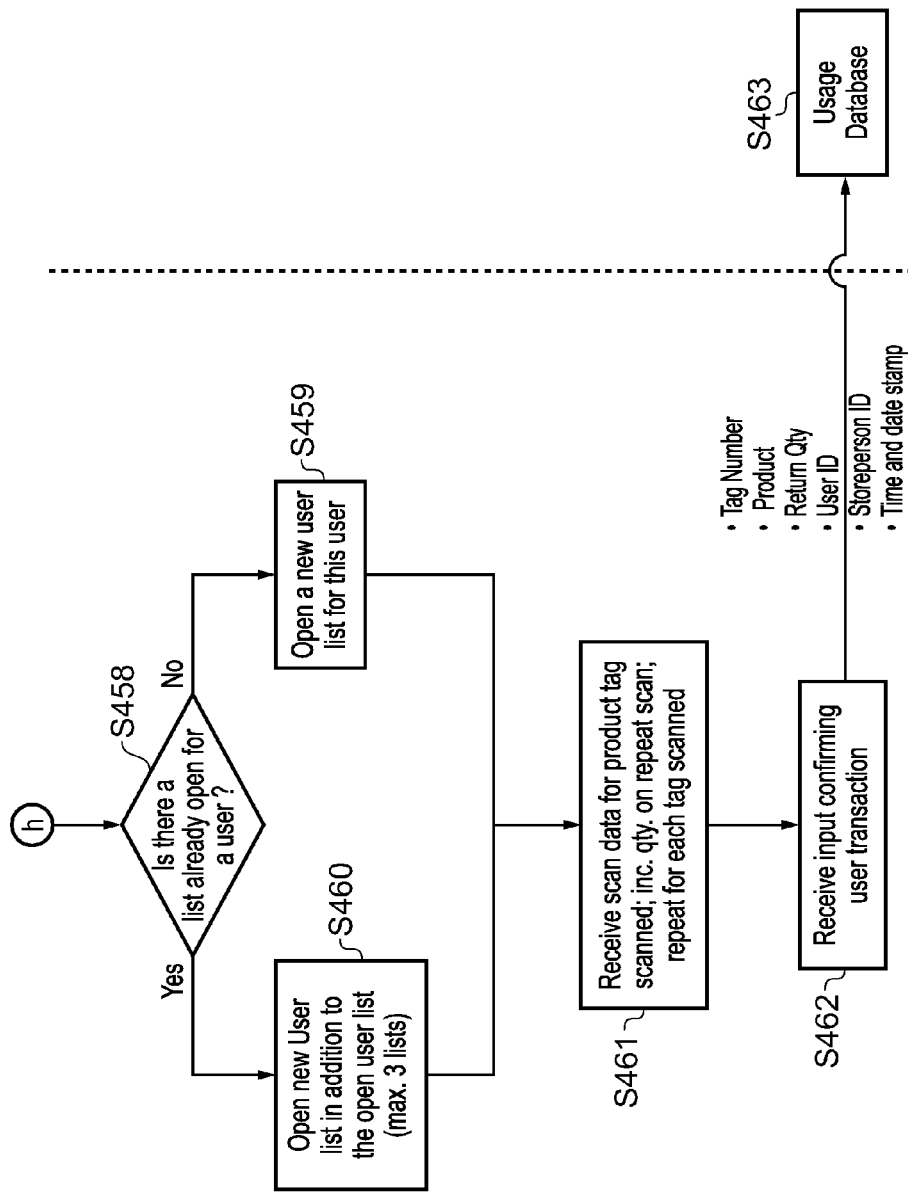

If the user/employee number is valid, processing continues as indicated in FIG. 4*f*. It is determined (s458) whether there is already a list open for the relevant user (see FIG. 3*b*). If not, a new user list is opened (s459) for this user. If, on the other hand, there is a list already open for this user, a new user list is opened (s460) for this user in addition to the open user list. With respect to the latter, in this embodiment, up to three user lists may be open for a particular user.

At this point, the store man begins to scan the (NFC-RFID) tags or products to be added to the user list. Thus, by scanning PDA 124 over the tag and receiving data via NFC transceiver 312 (FIG. 3*a*), PDA 124 receives (s461) scan data for the product associated with the tag and the details appear in the user list. (Upon the same tag being scanned multiple times, the quantity is simply incremented; and for each product whose tag is scanned, the details are added to the list, incremented in quantity if necessary.) Optionally, at this point, for a given state of the user list, the storeman may make manual entries to the list, e.g. to update or correct quantities, delete products from the list etc. Once all products have been scanned and the lists are complete (and/or corrected), PDA 124 receives an input from the storeman (button press) confirming that the user transaction is complete, at s462. As a result, data is transferred (e.g. via 3G transceiver 308 (FIG. 3*a*)) to CC 108, whereupon the database of CC 108 is updated with the confirmed usage data at s463. The data transmitted at s450 may include time and date stamp, store man ID, user ID, and, for each product in the user list, tag number, product and usage quantity.

Figure 4G:
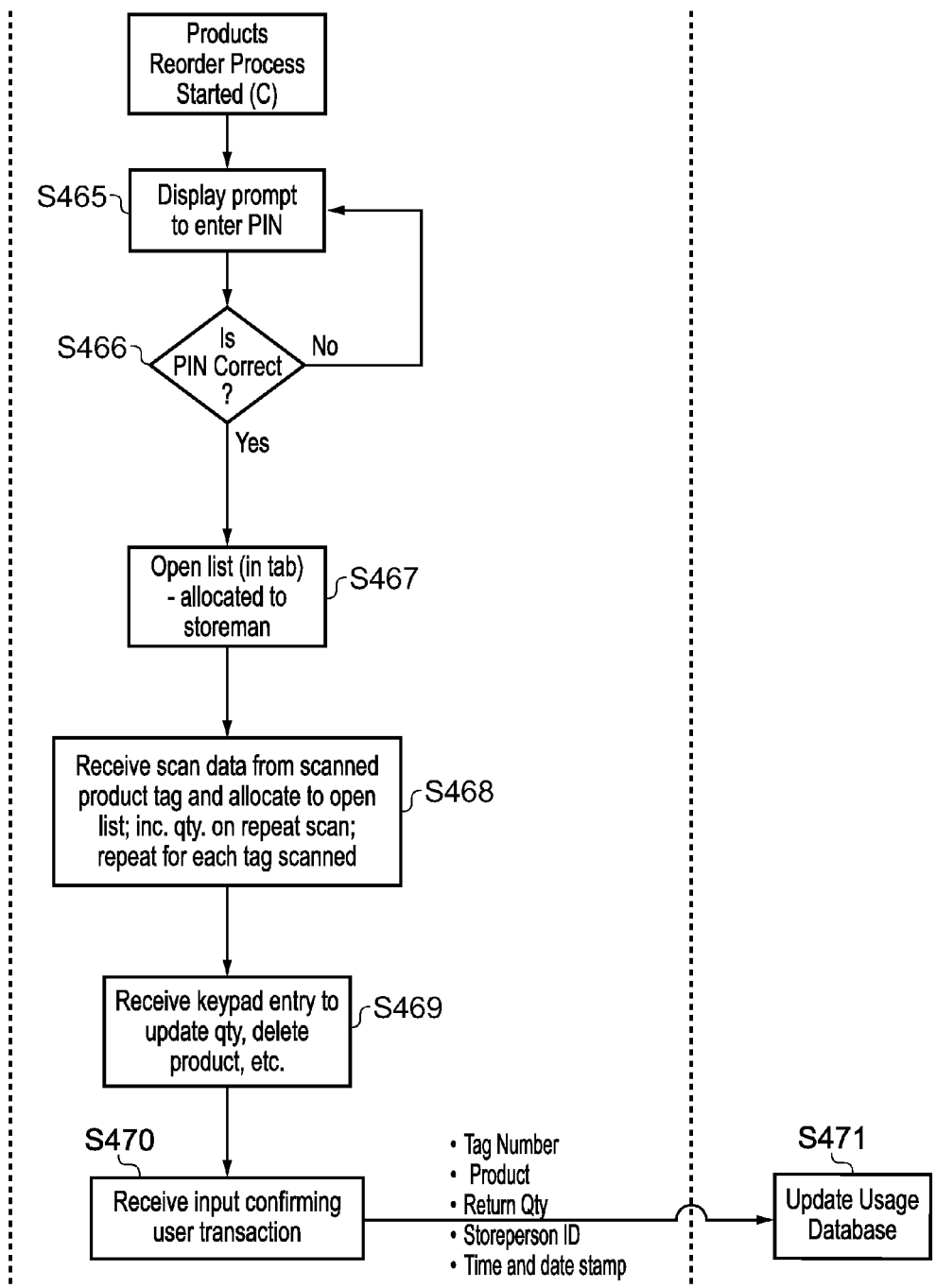

The product reorder process (C) is illustrated in FIG. 4*g*. Initially, a prompt is displayed for the store man to enter a PIN, at s465. If it is determined (s466) that a correct PIN has been entered, a list is opened (s467) in UI 126 (FIG. 3*b*), i.e. in a tab that is allocated to the storeman. Next, at s468, upon scanning of the tag for a product, scan data for the product is received and allocated to the open list. Upon the same item being scanned multiple times, the quantity is incremented. In addition, the list is updated to include data for each tag (product scanned). Optionally, inputs are received by the UI 126 (e.g. keypad) that are actions by the storeman to update or correct quantity, delete a product from the list, etc. (s469). Upon receiving an input confirming that the transaction is accurate and complete (s470), the relevant data is transmitted (e.g. via 3G cellular transceiver 308; FIG. 3*a*) to central computer 108 (FIG. 1). Upon receipt at the latter, its database is updated with the usage data at s471. The data received may comprise a time and date stamp, a store man ID, and, for each product, a tag number, product (description) and quantity.

FIG. 5 shows a storage cabinet for the storage of items according to embodiments of the invention. In one embodiment, the storeman may gain access to the cabinet 502 by means of using his personal ID card and swiping it on reader 504. Each door 506-512 of the cabinet 502 is a lockable door having an electronic lock which may be released via an internal computer (not shown). Stored behind each door 506-512 are items for dispensing to or returned by users. These may comprise both single use and reusable items, and may include items such as hand tools 520, packs of fixing elements 522 and rolls of tape 524, just by way of example. To each door is attached an NFC tag 514, each tag encoding product data corresponding to the item 520-526 contained inside that door. Thus, in this embodiment, and in the product tag scanning process of FIG. 4, the storeman may swipe his PDA over tag 514 prior to or after removing a product from inside the door to which that tag is attached.

In an alternative embodiment, while the stock control app 322 is running on PDA 124, the identification credentials of the store man are available for transmission via NFC transceiver 312 of the PDA 124. Thus, in the alternative embodiment, the store man "taps" the PDA 124 on the NFC tag 514 on the required door of the cabinet 502. This causes a communication channel to be opened between the PDA and the computer within the cabinet (not shown) via 3G transceiver 308 or via Wi-Fi connection (not shown). In this case, interaction between the PDA and the embedded computer identifies to the latter the owner of the PDA; it also identifies which items are present within the locker behind the door to which the scanned tag 514 is attached. Upon receiving the storeman's ID and authorizing by that storeman, the embedded computer activates the electronic lock so as to allow access by the store man to the required product in the locker.

In some embodiments, the storeman, if unsure of which locker the required item is held in, may search for the item via the stock control app 322, via the touchscreen interface 528 of the embedded computer, or via an interface to software running on central computer 108 (FIG. 1) to which access is available by remote PC or PDA.

In some embodiments, the App and NFC tags are used to access the doors on the locker system. I.e., key in pin number on app; identify the user; swipe NFC tag on door; smart PDA communicates to the local cabinet PC to obtain access rights to that door for that specific user; if allowed access door is unlocked; if not an 'access denied' message appears on the app. Once the door/drawer/compartment is unlocked the app can then be used to issue/restock/return inventory by swiping the tag and keying in the quantity.

In some embodiments, another way of entering a door may be through a search facility in the App. A product is selected from a search list. The app communicates with the PC in the locker/vending machine and lights up a guiding light LED in the vending/locker solution and/or indicates the location of the product in the app. The door may have unlocked upon product selection if the user has access and/or the door unlocks on tapping the appropriate NFC tag on the door. (These tags are likely to be embedded into doors/drawers/compartments to ensure they stay in situ and allow continuous access as required.)

For general inventory management—one tag on a bin or a shelf for product type management (multiple items of the same product)—the tag will hold: Location: the tag unique serial number (when manufactured) may be used for this and the part number of the product.

A separate tag may be required for batch number management. This tag may be on a plastic clothes peg arrangement and/or built into a releasable (reusable) cable tie. Batch numbers may be assigned as goods are received and put into the location by rewriting the batch number on an existing peg/cable tie or new peg/cable tie.

Asset management: in addition, the serial number, expiry and calibration date may be written to the tag, as the tag is attached to a specific product (rather than product type).

In some embodiments, a safe to use feature is employed, e.g. if scaffolding has been checked recently and is safe but the cloud based CC software is unable to be communicated with, the tag informs the app that it is safe to use up to a particular date.

In some embodiments, a configurable safety feature by product type may be employed, e.g. a gas monitor if the cloud based CC software is not contactable the app informs users not to use the product.

Figure 6A:
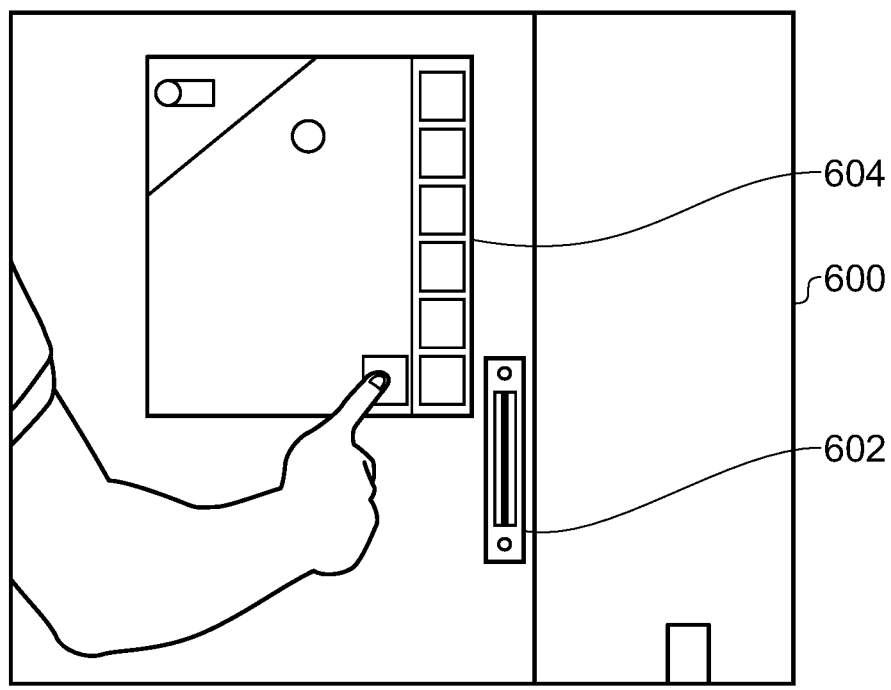
Figure 6B:
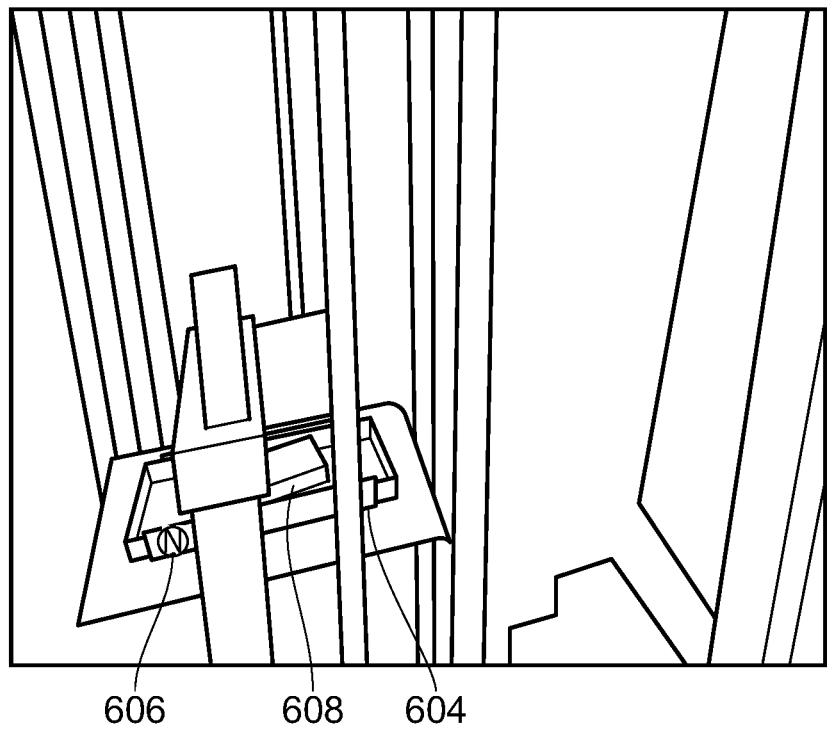
Figure 6C:
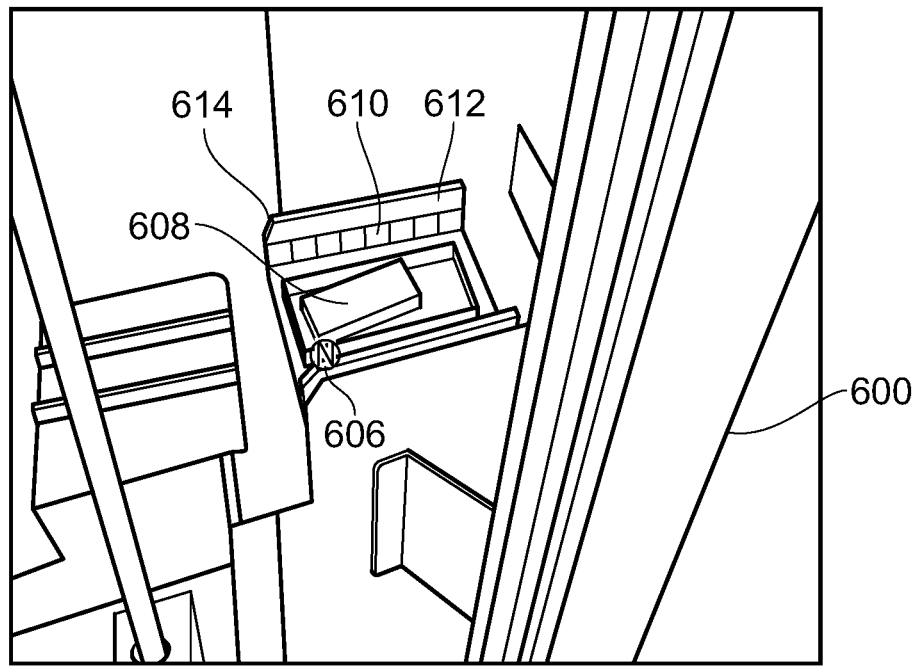
Figure 6D:
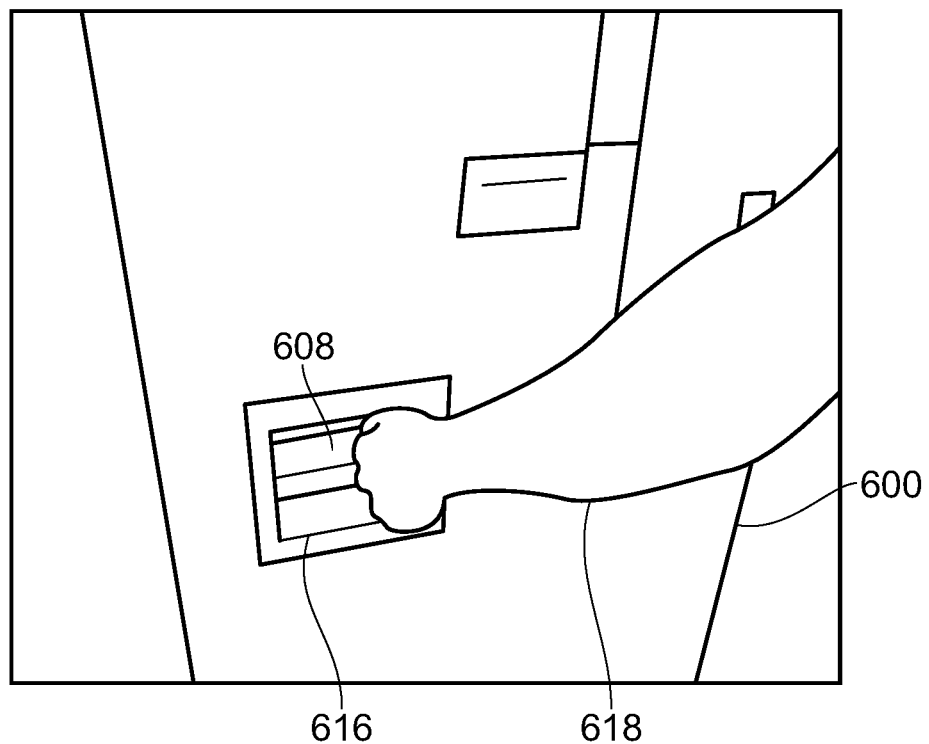

FIGS. 6(a)-6(d) show a system for dispensing of items in another embodiment of the invention, in a manner similar to a vending machine. This is the same as the embodiment of FIG. 5, except as described below. In this embodiment, having scanned their user card via card reader 602, the user selects an item for dispensing via touchscreen user interface 604. Within the item dispensing system 600, items (e.g. single use, disposable materials or components) are stored and/or transported on trays 604, to which an NFC tag 606 encoding product data pertaining to the item 608 in the tray 604 is attached, as seen in FIG. 6b. Referring to FIG. 6c, at a suitable point prior to the item 608 reaching a dispensing area or slot, and for example as indicated by NFC reader panels 610 on sidewalls 612 on rotating element 614 are used for reading tags. Thus, in use, the NFC reader panels 610 read the NFC tag 606 on tray 604 prior to dispensing and the product data for the item are retrieved by an embedded computer (not shown) within the dispensing system 600. Following rotation of rotating element 614, item 608 falls into dispensing slot 616, for retrieval by the user 618, as seen in FIG. 6(d).

In embodiments, a vending machine with a robotic arm scans and places trays/product using NFC and/or passive Gen 2 RFID into locations within it. The RFID/NFC tags may be adhered to an appropriate position on the tray or the product. The advantage of having the tag attached to the tray is that when the product and tray/bin are dispensed the tray can be reused with the same product when restocked or it can be rewritten with the App 322 quickly to contain a new product without the requirement to print. These trays and products may then be placed in a temporary holding area in the machine during the restock process where they can be scanned by the robotic arm sequentially and placed in a secure location ready to be dispensed when required by the user, ensuring the user receives the correct product. The main benefits are restock speed and restock accuracy— particularly accurate if the product barcode is read off the product by the app and then writes the information to the tag on the tray (automated matching).

The user may then select the item on a touch screen and the robotic arm selects and delivers the item to the dispensing area. In further embodiments, there is included the ability to scan an NFC and Gen 2 RFID labels on readers on the robotic arm. The system may also have the ability to rescan/add information to the tag within the machine from information via a touchscreen or app with authorisation rights. E.g. a dose of drugs for pharmaceutical dispensation to a specific patient could be written to the tag within the machine prior to dispensation and/or could be added to the tag on the medicine bottle/packaging with a PDA capable of writing RFID and NFC labels.

FIGS. 7(a)-7(b) show a storage arrangement within a store room in an alternative embodiment of the invention. In this embodiment, items are stored in bins 702, with each bin 702 having a scannable NFC tag 714 attached thereto. Each tag 714 corresponds uniquely to products 708 stored therein, and encodes relevant data pertaining to those products 708.

In some embodiments, NFC tags are embedded into parts bins (702, FIG. 7(b)), i.e. the tag 714 is embedded into bins as part of the manufacturing process for the bin. Tags 714 may also be embedded into racking/shelving. In another embodiment, the NFC tag 714 is embedded into a cable tie, or into a clip like a bull clip. These may be used for product identification, batch numbers, serial numbers, expiration dates, calibration dates etc.

Benefits of the embodiments of the preceding paragraph include:
1. protected to IP 68;
2. tag cannot be removed from bin/racking;
3. the bin tag can be locked down to a specific part or can be overwritten when the part is changed.

FIG. 8 shows an item dispensing system 800 according to another embodiment of the invention. The system incorporates an embedded computer (not shown) having a touchscreen interface 828. User access is via card reader 804. In this case, the dispensing system includes two doors 806 that are releasably lockable by means of electronic locks (not shown) controlled by the embedded computer. In this embodiment, inside the doors 806 are a multitude of bins 702 as illustrated in the embodiment of FIG. 7.

FIG. 9 shows in more detail the user interface 828 of the dispensing system 800 of FIG. 8. In conjunction with the hardware of FIG. 8, the interface of FIG. 9 may be useful for items that are not suitable for holding on site. The interface 828 enables a user, once identified and authorized, to order items, e.g. illustrated by icons 902, such as gloves, helmets, ear muffs and the like. In a preferred embodiment, after identifying themselves to the system via user card or by tapping (the NFC interface of) PDA 124 on an NFC transceiver of system 800, the embedded computer causes the display on user interface 828 of only those items that are authorized to be ordered or accessed by the currently logged in user.

In further embodiments, the PDA 124 is used within an access controlled cabinet. As the user swipes, the software knows who has accessed the cabinet. When the PDA is taken off charge (induction or connection) the software also knows that the device is now in use through a reduction in the current drawn by the device through the charger. The PDA 124 can then be used to scan bins for items that are required or are replenished via the app. This then updates our cloud based software via 3G or wireless to ensure each cabinet has a record of the running balance of each item within the cabinet. When the device is put back on charge the software knows the user has returned the device prior to shutting the door/drawer.

An advantage of Near Field Communication over traditional RFID is that because of its short range, one product can be read at a time. This allows reading and writing of multiple NFC tags in close proximity by 'tapping'. In alternative embodiments, app 322 is able to be able to read a bar code and automatically take that information and write it to an NFC tag or RFID passive Gen 2 tag and Vice Versa, i.e. read a tag and produce two dimensional and matrix barcodes (Quick reference code, QRC) label directly to a printer. This reduces human error in writing tags or producing bar codes. It also has the advantage of being able to read the barcode on a product and writing an RFID or NFC tag for the product without the user having to key in any information reducing human error. The app 322 may have the ability to add/amend certain data fields in the data set in this process such as batch number, expiry date if that information is not stored in the bar code.

In further embodiments, importing via Excel/CSV of item data for various data fields (Part no., description, expiry date, price, serial number, batch number, pack quantity, location reference, quantity at location etc.) into the cloud based CC software is possible; the latter can then disseminate this information to apps in the field as required. This product information may then be selected to write to a particular NFC/RFID tag. In embodiments, the PDA 124 is a phone/tablet that has NFC, Passive GEN 2 RFID, read/write capability and matrix barcode reading and 2 dimensional bar code reading capability. Preferably the PDA has the NFC/RFID combination.

In embodiments, techniques according to the invention may be used for general stores management, pharmaceutical management within vending machines and tool management within vending machines.

In further embodiments, the app may be used for batch control at the point of use because of the read/write capability. This is particularly important in sectors such as aerospace and healthcare. There is also the ability to scan an NFC tag that links the product to technical or safety information even an educational video on how the product works or is fitted.

Further aspects of the restock/reorder (FIG. 4(g)) processing, in further/additional embodiments, are as follows.

The App 322 may be used to speed up the restock process for vending machines/lockers that do not have sensors in them to automatically manage the restock process.

In more open systems where the user decides whether to physically take/return product from a location, the App can be used to manage the restock/return/issuance process.

In certain embodiments, it is necessary to manually indicate what is in the device via a touchscreen for the restock process. As well as or in place of the touch screen, the App and an NFC tag can be used for each conveyor, i.e. Product type. So the App can be used to tap a tag which identifies which particular solution it is and which conveyor/product is being replenished (indicating product type). After tapping the appropriate NFC tag, a replenishment quantity can be keyed into the App, which then updates the cloud based CC software via 3G or WIFI with the restock quantity and the person that did the restock.

Also for replenishment and validation, it is possible to scan a tag on a lid or bin which would indicate which solution it is, which location (SKU) and which product type. It may also indicate batch number/serial number, and expiry date of the product. The advantage of NFC tags is that information can be rewritten to change this information by the app at the location. E.g. new stock introduced into a compartment could have a new batch number/serial number and expiry dates written to the tag. This can then be 'tapped' to update the CC software.

In certain embodiments, a 'tap' of the reader or tag is used to gain access to the system. Then 'tap' a drawer tag to gain access to the appropriate drawer, then 'tap' the appropriate lid to gain access to the appropriate compartment (can be denied if the user does not have access to that specific compartment). The re-stocker keys in quantities of what they are replenishing in the App and storage cabinet with embedded PC validates the replenishment via the weight sensors after the restock is complete.

This process may be repeated for a user that wishes to issue using the App. The various tags are tapped for access and to identify product type. Items may then be taken and weight sensors update issuances to the cloud based CC software.

Where the product is a returnable asset such as a tool, the tag may be specific to the asset and have information such as serial number, calibration date, as well as part number and location written to the tag.

Advantages of the foregoing include the following.

1. App is used to speed up the user identification, access, replenishment and issuance process, and provide knowledge based information to the user (Cossh information), e.g. how to use, how it works, pictures, videos etc.

2. In sensor based solutions: the App records user intent with regard to quantity of stock issued/returned/restocked. Sensors then validate the intent. Thus, there is dual validation: NFC tag and quantities keyed into the app validated by weight sensors.

3. The matching process in point 2 for both restock and issuance ensures sensors are measuring accurately as a cross check can be made for every restock and issuance. I.e. Information entered into the App with information collected from the weight sensor can be checked in a discrepancy report to ensure system accuracy.

4. Expiry dates, calibration dates, batch numbers and serial numbers can be written to groups of products or where there is an individual NFC tag on a product e.g. in a locker or within a weight sensor bin or on a weight sensor shelf.

5. The tag can be used to identify the issuance and restock of a specific serial numbered item with the app. The weight sensor may then ensure that the asset was returned complete when returned to the locker. This ensures foreign object debris control, important in aerospace, nuclear generation, medical and food manufacturing.

Advantages of the stock monitoring techniques according to embodiments of the invention include the following: comprehensive indirect materials management; low touch RFID solution that is quick and easy to use; powerful reports to drive ever increasing levels of efficiency; cloud-based solution for anytime anywhere access; real-time notification of inventory usage by specific users; control material issues/returns to and from specific users; job code/cost centre tracking; complete audit log of all material usage; restricted access based on user-defined rules; real-time notifications of over-consumption; utilise the same cloud based software as dispensing solutions to provide enterprise wide visibility of all inventory transactions; mobile Access NFC RFID device; real-time visibility; inventory usage via mobile device by stores or specific users; real-time transaction processing via 3G wireless; ability to generate and overwrite product codes on the Inventor-e NFC RFID tags via the password protected App; red flag budget monitoring (by user and product);

multiple replenishment methods; enterprise-wide rollup reporting across multiple departments/stocking locations/sites While embodiments have been described by reference to embodiments of stock monitoring systems having various components in their respective implementations, it will be appreciated that other embodiments make use of other combinations and permutations of these and other components.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other. For example, in the context of airflow, where an outlet of A is coupled to an inlet of B it may be that one or more additional devices are provided between the outlet of A and the inlet of B.

Thus, while there has been described what are believed to be the preferred embodiments of the invention, those skilled in the art will recognize that other and further modifications may be made thereto without departing from the spirit and scope of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A stock monitoring system, for monitoring stock items in one or more storerooms, comprising:
   a first computer system, the first computer system including a database, data relating to stock items being stored in the database;
   a portable device, the portable device including a first processor and, coupled thereto, a first wireless transceiver for short-range communication, the portable device being configured to receive user inputs from a first user; and
   a second wireless transceiver, coupled to the first processor, the second wireless transceiver being configured for long-range wireless communications with the first computer system, remote from the portable device;
   an intermediate unit, the intermediate unit including a second processor and, coupled thereto, a reader and a wireless transmitter, the reader and/or wireless transmitter being configured for short-range communication;

wherein the second processor is configured, upon reading the user ID from an ID card of the second user by the reader, for transmitting the user ID user via the wireless transmitter;

wherein the first processor is configured for
receiving a user ID of a second user via the first wireless transceiver, and
receiving one or more further inputs, at least a first input being received via the first wireless transceiver and including item data corresponding to an item; and wherein the first processor is configured for transmitting to the first computer system, remote from the portable device via the second wireless transceiver, at least the item data, associated with the user ID.

2. The stock monitoring system of claim 1, wherein receiving the first input comprises receiving the item data following placing of the portable device in the vicinity of a tag, the tag being mounted on or associated with the item and embodying encoded item data corresponding to the item.

3. The stock monitoring system of claim 1, wherein the second processor is configured, upon scanning the user ID card of the first user, for extracting the user ID and reformatting the user ID prior to transmission via the wireless transmitter.

4. A portable device for use in a stock monitoring system for monitoring items of stock in one or more storerooms for stock items, the stock monitoring system including a first computer system, wherein data relating to stock items is stored in a database of the first computer system, the portable device comprising:

a first processor and, coupled thereto, a first wireless transceiver and a second wireless transceiver;

wherein the first wireless transceiver is configured for short-range communication; and wherein the second wireless transceiver is configured for long-range wireless communications with the first computer system, remote from the portable device;

wherein the portable device is configured to receive user inputs from a first user; and wherein the first processor is configured for
receiving a user ID of a second user via the first wireless transceiver, the user ID having been transmitted via a wireless transmitter of an intermediate unit upon reading of the user ID from an ID card of the second user by a reader of the intermediate unit; and
receiving one or more further inputs, at least a first input being received via the first wireless transceiver and including item data corresponding to an item, and at least a second user input being from the first user and associating the item with the second user; and wherein the first processor is configured for transmitting to the first computer system via the second wireless transceiver, at least the item data, associated with the user ID.

5. The portable device of claim 4, wherein receiving the first input comprises receiving the item data following placing of the portable device in the vicinity of a tag, the tag being mounted on or associated with the item and embodying encoded item data corresponding to the item.

6. The portable device of claim 5, wherein the tag comprises a NFC RFID tag.

7. The portable device of claim 4, wherein the one or more further inputs include at least a second user input from the first user and associating the item with the second user.

8. The portable device of claim 4, wherein the portable device comprises a PDA having a graphical and/or touch-screen user interface.

9. The portable device of claim 8, wherein the user interface is configured for displaying as plurality of tabs, each tab corresponding to a user.

10. The portable device of claim 9, wherein first user input includes selection by the first user of a tab corresponding to the second user.

11. The portable device of claim 4, wherein the one or more further inputs include a third user input being from the first user via the user interface, the third user input commanding the sending of the item data, associated with the user ID, to the remote system.

12. The portable device of claim 4, wherein the reader, wireless transmitter and/or the first wireless transceiver comprise a near field communication (NFC) device.

13. The portable device of claim 4, wherein the second wireless transceiver is incorporated in the portable device.

14. An intermediate unit for a stock monitoring system, the stock monitoring system being for monitoring stock items in one or more storerooms and including a first computer system, wherein data relating to stock items is stored in a database of the first computer system, a portable device, the portable device including a first processor and, coupled thereto, a first wireless transceiver for short-range communication, the portable device being configured to receive user inputs from a first user; and a second wireless transceiver, coupled to the first processor, the second wireless transceiver being configured for long-range wireless communications with the first computer system, remote from the portable device; wherein the first processor is configured for receiving a user ID of a second user, and receiving one or more further inputs, at least a first input being received via the first wireless transceiver and including item data corresponding to an item; and wherein the first processor is configured for transmitting to the first computer system, remote from the portable device via the second wireless transceiver, at least the item data, associated with the user ID, the intermediate unit comprising:

a second processor and, coupled thereto, a reader and a wireless transmitter, the reader and/or wireless transmitter being configured for short-range communication;

wherein the second processor is configured, upon reading the user ID from an ID card of the second user by the reader, for transmitting the user ID user via the wireless transmitter.

15. The intermediate unit of claim 14, wherein the second processor is configured for transmitting the user ID user via the wireless transmitter for a predetermined period.

16. The intermediate unit of claim 14, wherein the second processor is configured for securely erasing the user ID from the first device at the end of the predetermined period.

17. The intermediate unit of claim 14, wherein the second processor is configured, upon scanning the user ID card of the first user, for extracting the user ID and reformatting the user ID prior to transmission via the wireless transmitter.

18. The intermediate unit of claim 14, wherein the reader, wireless transmitter and/or the first wireless transceiver comprise a near field communication (NFC) device.

19. The intermediate unit of claim 14, further comprising a third wireless transceiver configured for communication with the first computer system.

20. A method carried out in a portable device for use in a stock monitoring system, the stock monitoring system being for monitoring items of stock in one or more storerooms for stock items and including a first computer system, wherein data relating to stock items is stored in a database of the first computer system, the portable device comprising a first processor and, coupled thereto, a first wireless transceiver and a second wireless transceiver; wherein the first wireless transceiver is configured for short-range communication; and wherein the second wireless transceiver is configured for long-range wireless communications with the first computer system, remote from the portable device; the method comprising receiving one or more user inputs from a first user; and
    operating the first processor for receiving a user ID of a second user via the first wireless transceiver, the user ID having been transmitted via a wireless transmitter of an intermediate unit upon reading of the user ID from an ID card of the second user by a reader of the intermediate unit; and receiving one or more further inputs, at least a first input being received via the first wireless transceiver and including item data corresponding to an item, and at least a second user input being from the first user and associating the item with the second user; and transmitting to the first computer system via the second wireless transceiver, at least the item data, associated with the user ID.

\* \* \* \* \*

UNITED STATES PATENT AND TRADEMARK OFFICE
CERTIFICATE OF CORRECTION

PATENT NO.      : 9,542,664 B2
APPLICATION NO. : 14/480126
DATED           : January 10, 2017
INVENTOR(S)     : Dean Charles Henry et al.

It is certified that error appears in the above-identified patent and that said Letters Patent is hereby corrected as shown below:

In the Claims

Claim 1, Column 18, Line 61:
Please change "first user; and" to
--first user;--

Claim 1, Column 18, Line 65:
Please change "computer system, remote from the portable device;" to
--computer system, remote from the portable device; and--

Claim 1, Column 19, Line 6:
Please change "reader for transmitting the user ID user via the wireless" to
--reader for transmitting the user ID via the wireless--

Claim 9, Column 20, Line 8:
Please change "interface is configured for displaying as plurality of tabs," to
--interface is configured for displaying a plurality of tabs--

Claim 14, Column 20, Line 50:
Please change "reader, for transmitting the user ID user via the wireless" to
--reader, for transmitting the user ID via the wireless--

Claim 15, Column 20, Line 53:
Please change "processor is configured for transmitting the user ID user via" to
--processor is configured for transmitting the user ID via--

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*